US012777338B2

(12) United States Patent
Wu et al.

(10) Patent No.: US 12,777,338 B2
(45) Date of Patent: Oct. 27, 2026

(54) CELLULAR MAP SURVEY FOR AUTONOMOUS VEHICLES

(71) Applicant: TuSimple, Inc., San Diego, CA (US)

(72) Inventors: Yuzhe Wu, San Diego, CA (US); Kuntong Xu, San Diego, CA (US); Changyi Zhao, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 290 days.

(21) Appl. No.: 18/425,365

(22) Filed: Jan. 29, 2024

(65) Prior Publication Data

US 2024/0259828 A1 Aug. 1, 2024

Related U.S. Application Data

(60) Provisional application No. 63/482,313, filed on Jan. 31, 2023, provisional application No. 63/482,315, filed on Jan. 31, 2023.

(51) Int. Cl.
*H04W 16/18* (2009.01)

(52) U.S. Cl.
CPC .................................. *H04W 16/18* (2013.01)

(58) Field of Classification Search
CPC .................................................... H04W 16/18
See application file for complete search history.

(56) References Cited

U.S. PATENT DOCUMENTS

2011/0274038 A1 11/2011 Zhu et al.
2014/0309853 A1 10/2014 Ricci
2019/0320328 A1* 10/2019 Magzimof ............ H04W 16/22
2021/0112423 A1 4/2021 Maheshwari et al.
2022/0150794 A1 5/2022 Sparks et al.
2023/0075349 A1* 3/2023 Sparks .............. H04W 28/0236
2024/0098537 A1 3/2024 Shrivastava et al.
2024/0196238 A1* 6/2024 Huda .................... H04W 24/02
2024/0259829 A1* 8/2024 Wu ....................... H04W 16/18

FOREIGN PATENT DOCUMENTS

WO 2018/125686 A2 7/2018

OTHER PUBLICATIONS

PCT International Search Report and Written Opinion of the International Searching Authority, or the Declaration for PCT Application Serial No. PCT/US2024/013446 dated May 21, 2024 (May 21, 2024), 19 pages.

* cited by examiner

*Primary Examiner* — David Bilodeau
(74) *Attorney, Agent, or Firm* — Ashurst Perkins Coie US LLP

(57) ABSTRACT

A system accesses cellular information and network information. The cellular information provides information about cellular coverage along a road. The cellular information also provides information about cellular coverage with respect to multiple network providers. The network information provides information about network communication conditions along the road. The network information is detected from communications with a remote server. The system determines network coverage along the road based on the cellular information and the network information. The system creates a cellular map that indicates the determined network coverage along the road.

17 Claims, 8 Drawing Sheets

Network provider 150a

Cellular map 104a

Table of Measurements 410a

| | Timestamp 148a | Location 146a | Bitrate 412a |
|---|---|---|---|
| 1 | 2022-09-30 16:22:03 | 32.094541666666665,-110.79199033... | 1,453 |
| 2 | 2022-09-30 16:22:04 | 32.094541666666665,-110.79199033... | 3,898 |
| 3 | 2022-09-30 16:22:05 | 32.094541666666665,-110.79199033... | 2,069 |
| 4 | 2022-09-30 16:22:06 | 32.094541666666665,-110.79199033... | 2,069 |
| ⋮ | ⋮ | ⋮ | ⋮ |

Table of Measurements 410b

| | Timestamp 148b | Location 146b | Bitrate 412b |
|---|---|---|---|
| 1 | 2022-09-30 16:22:03 | 32.094541666666665,-110.79199033... | 1,938 |
| 2 | 2022-09-30 16:22:04 | 32.094541666666665,-110.79199033... | 2,862 |
| 3 | 2022-09-30 16:22:05 | 32.094541666666665,-110.79199033... | 1,552 |
| 4 | 2022-09-30 16:22:06 | 32.094541666666665,-110.79199033... | 1,552 |
| ⋮ | ⋮ | ⋮ | ⋮ |

CELLULAR MAP SURVEY FOR AUTONOMOUS VEHICLES

PRIORITY

This application claims priority to U.S. Provisional Patent Application No. 63/482,313 filed Jan. 31, 2023, and titled “Cellular Map Survey for Autonomous Vehicles,” and U.S. Provisional Patent Application No. 63/482,315 filed Jan. 31, 2023 titled “Onboard Cellular and Network Information Detection for Autonomous Vehicles,” which are incorporated herein by reference.

TECHNICAL FIELD

The present disclosure relates generally to autonomous vehicles. More particularly, the present disclosure is related to a cellular map survey for autonomous vehicles.

BACKGROUND

One aim of autonomous vehicle technology is to provide vehicles that can safely navigate with limited or no driver assistance. While traveling on a road, autonomous vehicles communicate all kinds of data to other devices or systems. For example, an autonomous vehicle may communicate location data, and sensor data, among others to other devices or systems. Some parts of the road ahead of the autonomous vehicle may have poor network coverage. If the autonomous vehicle travels through those parts of the road, the autonomous vehicle may not be able to communicate data to other devices or systems.

SUMMARY

This disclosure recognizes various problems and previously unmet needs related to autonomous vehicle technology, and more specifically, the lack of a solution to generate an accurate cellular map that indicates network coverage along routes of autonomous vehicles, the lack of a solution to detect network coverage inconsistencies among multiple network coverages determined in multiple trips along a road, the lack of a solution to address the detected network coverage inconsistencies, the lack of a solution to detect geographical areas of poor network coverages, and the lack of a solution to reduce network interruptions for autonomous vehicles.

Certain embodiments of the present disclosure provide unique technical solutions to technical problems of current autonomous vehicle technology and network technology, including those problems described above, to improve autonomous vehicle technology and network technology. More specifically, the present disclosure contemplates a system, a method, and a device to generate a cellular map that indicates network coverage along routes.

The disclosed system is configured to detect cellular information and network information that provide information about network connectivity, condition, and coverage (collectively referred to herein as network coverage) along a road. In response to detecting cellular information and network information, the disclosed system can determine the network coverage along the road. The disclosed system creates a cellular map that indicates the detected network coverage. The disclosed system may use the cellular map to detect areas with poor network coverage (e.g., network coverage that does not satisfy network communication requirements). In response, the disclosed system may inform one or more autonomous vehicles to avoid those areas with poor network coverage.

In certain embodiments, multiple autonomous vehicles in a fleet (or any other vehicle) may detect multiple cellular information and network information as they travel along the road. The disclosed system is configured to monitor the network performance of multiple autonomous vehicles (or any other vehicle). If the disclosed system detects that the network performance of a particular autonomous vehicle (or non-autonomous or semi-autonomous vehicles) does not correspond to the network performance of other autonomous vehicles (or other non-autonomous or other semi-autonomous vehicles), the disclosed system may determine that a network communication device associated with the particular autonomous vehicle (or non-autonomous or semi-autonomous vehicles) may need a software update or physical maintenance service. In response, the disclosed system may deploy a software update package to the autonomous vehicle (or non-autonomous or semi-autonomous vehicles) or tag the autonomous vehicle (or non-autonomous or semi-autonomous vehicles) indicating that it needs a service. In this manner, the disclosed system improves the network communications for the autonomous vehicle (or vehicle). If such cases are left undetected, the autonomous vehicle may not be able to communicate required and/or time-sensitive data to another device (e.g., the oversight server). For example, the autonomous vehicle may not be able to communicate sensor data, location data, or other types of data in real-time (or close to real-time within an acceptable network routing latency). This may lead to having an inaccurate location of the autonomous vehicle, not knowing the location of the autonomous vehicle, and not knowing the road condition ahead of the autonomous vehicle, among other issues. Therefore, by monitoring the network performance of the autonomous vehicle and detecting that the autonomous vehicle may need a service (e.g., software update or physical maintenance), the autonomous vehicle may receive the required service. In this manner, the disclosed system improves the underlying operations of the autonomous vehicle and the network communication of the autonomous vehicle.

This, in turn, leads to improving the autonomous vehicle navigation technology, e.g., by improving the data communications for the autonomous vehicles that leads to obtaining more accurate sensor data and location data in real-time (or close to real-time within acceptable network routing latency), knowing a more accurate location of the autonomous vehicle and the road condition ahead of the autonomous vehicle, and providing commands to improve the navigation of the autonomous vehicle according to the obtained sensor data and location data.

In certain embodiments, the operations of collection and detection of cellular information and network information described herein may be implemented by any vehicle that is equipped with the AVCG manager. In this manner, the disclosed system allows the operation of cellular information and network information collection and detection to be decoupled from an autonomous vehicle—meaning that it can be implemented by any semi-autonomous vehicle, non-autonomous vehicle, a mobile device, and the like (collectively referred to herein as a vehicle) that is equipped with the AVCG manager.

In certain embodiments, the disclosed system is configured to dynamically switch between network providers that provide network communication channels to a vehicle to reduce (or prevent) network interruptions at the vehicle. For example, if the disclosed system determines that a first network provider provides poor network coverage at a particular location of the road ahead of the vehicle, the disclosed system may switch to another network provider. In this manner, the disclosed system improves the network communications for the vehicle by detecting areas of network holes, poor network coverage, or network dead zones, and dynamically switching to a particular network provider that provides more optimal network coverage for the vehicle.

In certain embodiments, the disclosed system is configured to create multiple cellular maps based on multiple trips by one or more vehicles (e.g., autonomous vehicle(s), semi-autonomous vehicle(s), and/or non-autonomous vehicle(s)). In response, the disclosed system is able to analyze the multiple cellular maps across multiple trips and determine inconsistencies among them. If it is determined that a first network coverage at a particular portion of the road as indicated in one cellular map does not correspond to a second network coverage at the particular portion of the road as indicated in another cellular map, the disclosed system may determine the cause of the inconsistency between these network coverages and provide a solution to address (or remedy) the network coverage inconsistency. For example, if the disclosed system determines that the cause of the network coverage inconsistency is poor network coverage by a particular network provider at a particular location, the disclosed system may instruct vehicle(s) to dynamically switch to another network provider before reaching the particular location.

Accordingly, the disclosed system improves the autonomous vehicle technology, underlying operations of the autonomous vehicle, and network communications for the autonomous vehicles. This leads to providing safer driving conditions and experience for the autonomous vehicle, surrounding vehicles, and protecting pedestrians.

Onboard Cellular and Network Information Detection for Autonomous Vehicles

This disclosure contemplates systems and methods for detecting cellular and network information that provide information about cellular coverage and network coverage along routes, respectively, similar to that described above. For example, this disclosure contemplates an onboard cellular and network data detection system that is deployed on a vehicle, and is configured to establish network communications with base stations and remote servers to detect cellular and network information. In certain embodiments, the vehicle may be an autonomous vehicle, a non-autonomous vehicle, or a semi-autonomous vehicle.

In certain embodiments, a system comprises a memory operably coupled to a processor. The memory is configured to store a routing plan for a first autonomous vehicle, wherein the routing plan indicates a road to be traveled by the first autonomous vehicle. The processor is configured to access a first plurality of cellular information that comprises information about cellular communication conditions along at least a portion of the road. The first plurality of cellular information comprises a first cellular information associated with a first network provider and a second cellular information associated with a second network provider. The first cellular information comprises information about cellular communication conditions determined from a first communication path with a first base station, where the first communication path is provided by the first network provider. The second cellular information comprises information about cellular communication conditions determined from a second communication path with a second base station, where the second communication path is provided by the second network provider. The processor accesses first network information that comprises information about network communication conditions along at least the portion of the road. The processor determines a first network coverage along at least the portion of the road based at least in part upon the first plurality of cellular information and the first network information. The processor creates a first network coverage map that indicates the determined network coverage along at least the portion of the road.

Cellular Map Survey for Autonomous Vehicles

This disclosure contemplates systems and methods for generating a cellular map that indicates network coverage along routes based on the detected cellular and network information, similar to that described above.

In certain embodiments, a system comprises a first network interface and a second network interface, each operably coupled to a processor. The first network interface is subscribed to a first network provider and configured to communicate with a first base station via network paths provided by the first network provider. The second network interface is subscribed to a second network provider and configured to communicate with a second base station via network paths provided by the second network provider. The processor is associated with a vehicle. The processor is configured to establish a first network communication path with the first base station using the first network interface. The processor detects a first cellular information associated with the first network provider based at least in part upon the first established network communication path with the first base station, wherein the first cellular information provides information about cellular communication conditions provided by the first network provider along at least a portion of a road. The processor establishes a second network communication path with the second base station using the second network interface. The processor detects a second cellular information associated with the second network provider based at least in part upon the second established network communication path with the second base station, wherein the second cellular information provides information about cellular communication conditions provided by the second network provider along at least the portion of the road. The processor establishes a third network communication path with a remote server via a network. The processor detects network information based at least in part upon the third established network communication path with the remote server. A network coverage along at least the portion of the road is determined based at least in part upon the first cellular information, the second cellular information, and the network information.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions to create an accurate cellular map that indicates network coverage along routes of autonomous vehicles, detect network coverage inconsistencies among multiple network coverages determined in multiple trips along a road, address the detected network coverage inconsistencies, detect geographical areas of poor network coverages, and reduce network interruptions for autonomous vehicles. The present disclosure provides various systems, methods, and devices to create a more accurate cellular map, detect network coverage inconsistencies among multiple network coverages determined in multiple trips along a road, address the detected network coverage inconsistencies, detect geographical areas of poor network coverages, and reduce network interruptions for autonomous vehicles. Embodiments of the present disclosure and its advantages may be understood by referring to FIGS. 1 through 7. FIGS. 1 through 7 are used to describe a system and method to implement techniques and navigational solutions based on the cellular map.

System Overview

Figure 1:
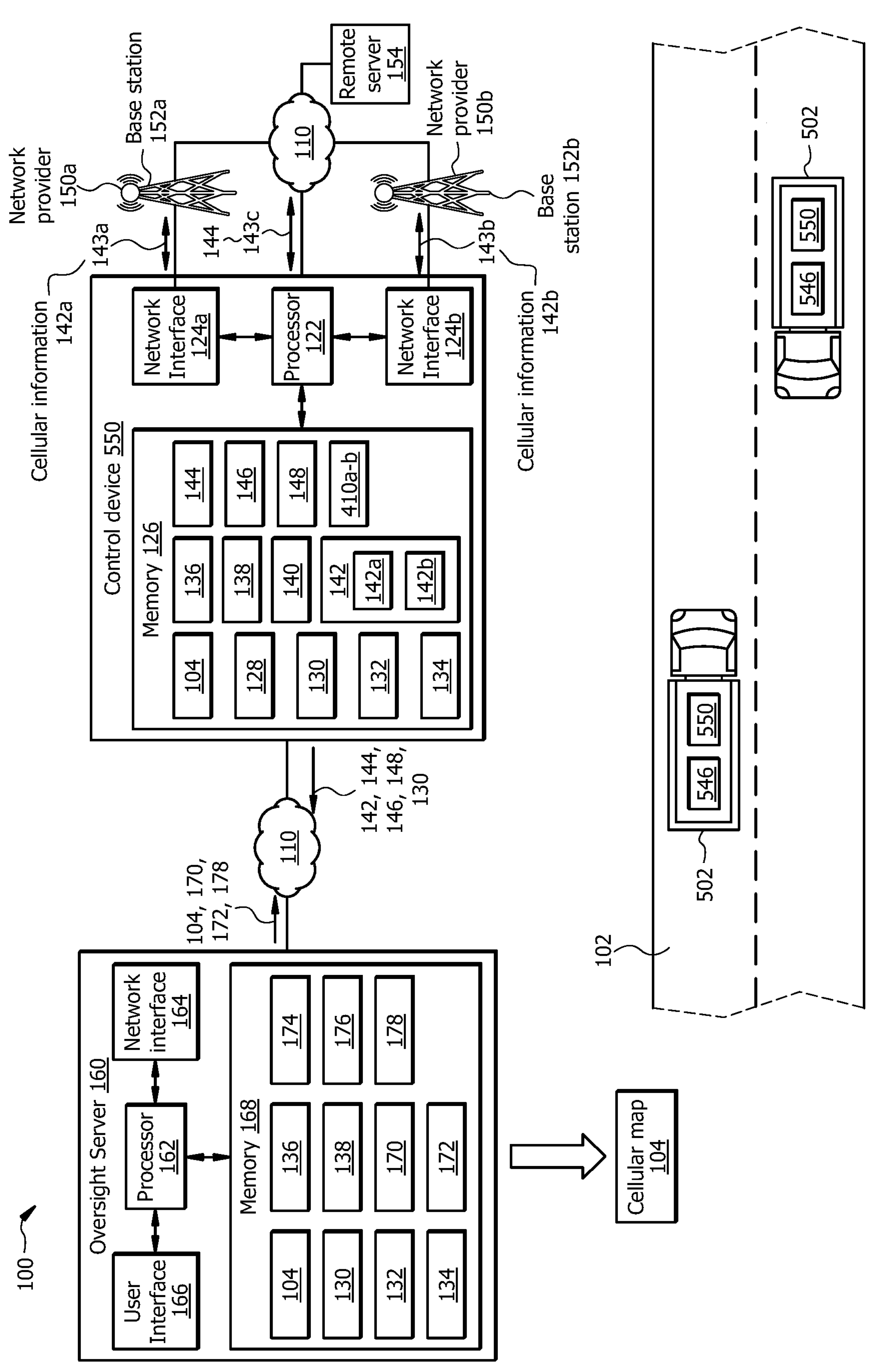
FIG. 1 illustrates an embodiment of a system configured to create a cellular map.

FIG. 1 illustrates an embodiment of a system 100 configured to generate a cellular map 104 that indicates network connectivity, conditions, and coverage along road(s) 102 based on cellular information and network information detected while traveling along the road(s). In response to generating the cellular map 104, system 100 may use the cellular map 104 to perform further analysis across multiple trips along road(s) 102 and in response to detecting network dead zone(s), poor network coverage, and/or poor network communication performance of an autonomous vehicle 502 at particular locations along a road, perform one or more actions to determine a cause of network interruptions for autonomous vehicles 502, and suggest alternative routes to minimize network interruptions for the autonomous vehicles 502. FIG. 1 further illustrates a simplified schematic of a road 102 traveled by the autonomous vehicle(s) 502. Although two autonomous vehicles 502 are shown in FIG. 1, any number of autonomous vehicles 502 may be used to perform the collection and detection of cellular information and network information.

In certain embodiments, the system 100 comprises the autonomous vehicle 502, an oversight server 160, base station(s) 152*a,b*, and a remote server 154 communicatively coupled to one another via a network 110. The autonomous vehicle 502 comprises a control device 550 that generally facilitates the autonomous operations of the autonomous vehicle 502. The control device 550 comprises a processor 122 in signal communication with a memory 126. Memory 126 stores software instructions 128 that when executed by the processor 122 cause the control device 550 to perform one or more operations described herein. Memory 126 also stores Autonomous Vehicle Communication Gateway (AVCG) manager 140 that when executed by the processor 122, causes the control device 550 to perform one or more operations described herein. The autonomous vehicle 502 is communicatively coupled to other autonomous vehicles 502, systems, devices, servers, databases, and the like via a network 110. The oversight server 160 comprises a processor 162 in signal communication with a memory 168. Memory 168 stores software instructions 170 that when executed by the processor 162 cause the oversight server 160 to perform one or more operations described herein. Network 110 enables communications among the components of the system 100. For example, network 110 allows the autonomous vehicle 502 to communicate with other autonomous vehicles 502, systems, devices, servers, databases, and the like. In other embodiments, system 100 may not have all of the components listed and/or may have other elements instead of, or in addition to, those listed above. System 100 may be configured as shown or in any other configuration.

In general, the system 100 provides several practical applications and technical advantages that overcome the previously unmet technical problems in autonomous vehicle technology and network technology. The system 100 is configured to detect cellular information 142 and network information 144 that provide information about network connectivity, condition, and coverage (collectively referred to herein as network coverage) along a road 102. In response to detecting cellular information 142 and network information 144, the system 100 can determine the network coverage along the road 102. The system 100 creates a cellular map that indicates the detected network coverage. The system 100 may use the cellular map to detect areas with poor network coverage (e.g., network coverage that does not satisfy network communication requirements). In response, the system 100 may inform one or more autonomous vehicles to avoid those areas with poor network coverage. The one or more autonomous vehicles may be navigated to avoid those areas with the poor network coverage.

In certain embodiments, multiple autonomous vehicles 502 in a fleet (or any other vehicle) may detect multiple cellular information 142 and network information 144 as they travel along the road. The system 100 is configured to monitor the network performance of the multiple autonomous vehicles 502 (or non-autonomous or semi-autonomous vehicles). If the system 100 detects that the network performance of a particular autonomous vehicle 502 (or non-autonomous or semi-autonomous vehicles) does not correspond to the network performance of other autonomous vehicles 502 (or other non-autonomous or semi-autonomous vehicles), the system 100 may determine that a network communication device associated with the particular autonomous vehicle 502 (or non-autonomous or semi-autonomous vehicles) may need a software update or physical maintenance service. In response, the system 100 may deploy a software update package to the autonomous vehicle 502 (or non-autonomous or semi-autonomous vehicles) or tag the autonomous vehicle 502 (or non-autonomous or semi-autonomous vehicles) indicating that it needs a service. In this manner, the system 100 improves the network communications for the autonomous vehicle 502 (or non-autonomous or semi-autonomous vehicles). If such cases are left undetected, the autonomous vehicle 502 may not be able to communicate required and/or time-sensitive data to another device (e.g., the oversight server 160). For example, the autonomous vehicle 502 may not be able to communicate sensor data, location data, or other types of data in real-time (or close to real-time within an acceptable network routing latency). This may lead to having an inaccurate location of the autonomous vehicle 502, not knowing where is the location of the autonomous vehicle 502, and not knowing the road condition ahead of the autonomous vehicle 502, among other issues. Therefore, by monitoring the network performance of the autonomous vehicle 502 and detecting that the autonomous vehicle 502 may need a service (e.g., software update or physical maintenance), the autonomous vehicle 502 may receive the required service. In this manner, the system 100 improves the underlying operations of the autonomous vehicle and the network communication of the autonomous vehicle.

This, in turn, leads to improving the autonomous vehicle navigation technology, e.g., by improving the data communications for the autonomous vehicles that leads to obtaining more accurate sensor data and location data in real-time (or close to real-time within acceptable network routing latency), knowing a more accurate location of the autonomous vehicle and the road condition ahead of the autonomous vehicle, and providing commands to improve the navigation of the autonomous vehicle according to the obtained sensor data and location data.

In certain embodiments, the operations of collection and detection of cellular information 142 and network information 144 described herein may be implemented by any vehicle that is equipped with the AVCG manager 140. In this manner, the system 100 allows the operation of cellular information 142 and network information 144 collection and detection to be decoupled from an autonomous vehicle 502—meaning that it can be implemented by any semi-autonomous vehicle, non-autonomous vehicle, a mobile device, and the like (collectively referred to herein as a vehicle) that is equipped with the AVCG manager 140.

In certain embodiments, the system 100 is configured to dynamically switch between network providers that provide network communication channels to a vehicle to reduce (or prevent) network interruptions at the vehicle. For example, if the system 100 determines that a first network provider provides poor network coverage at a particular location of the road ahead of the vehicle, the system 100 may switch to another network provider. In this manner, the system 100 improves the network communications for the vehicle by detecting areas of network holes, poor network coverage, or network dead zones, and dynamically switching to a particular network provider that provides a more optimal network coverage for the vehicle.

In certain embodiments, the system 100 is configured to create multiple cellular maps based on multiple trips by one or more vehicles (e.g., autonomous vehicle(s) 502, semi-autonomous vehicle(s), and/or non-autonomous vehicle(s)). In response, the system 100 is able to analyze the multiple cellular maps across multiple trips and determine inconsistencies among them. If it is determined that a first network coverage at a particular portion of the road as indicated in one cellular map does not correspond to a second network coverage at the particular portion of the road as indicated in another cellular map, the system 100 may determine the cause of the inconsistency between these network coverages and provide a solution to address (or remedy) the network coverage inconsistency. For example, if the system 100 determines that the cause of the network coverage inconsistency is poor network coverage by a particular network provider at a particular location, the system 100 may instruct vehicle(s) to dynamically switch to another network provider before reaching the particular location.

Accordingly, the system 100 improves the autonomous vehicle technology, underlying operations of the autonomous vehicle, and network communications for the autonomous vehicles. This leads to providing safer driving conditions and experience for the autonomous vehicle 502, surrounding vehicles, and protecting pedestrians.

System Components

Network 110 may include any interconnecting system capable of transmitting audio, video, signals, data, messages, or any combination of the preceding. Network 110 may include all or a portion of a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network.

Example Autonomous Vehicle

Figure 5:
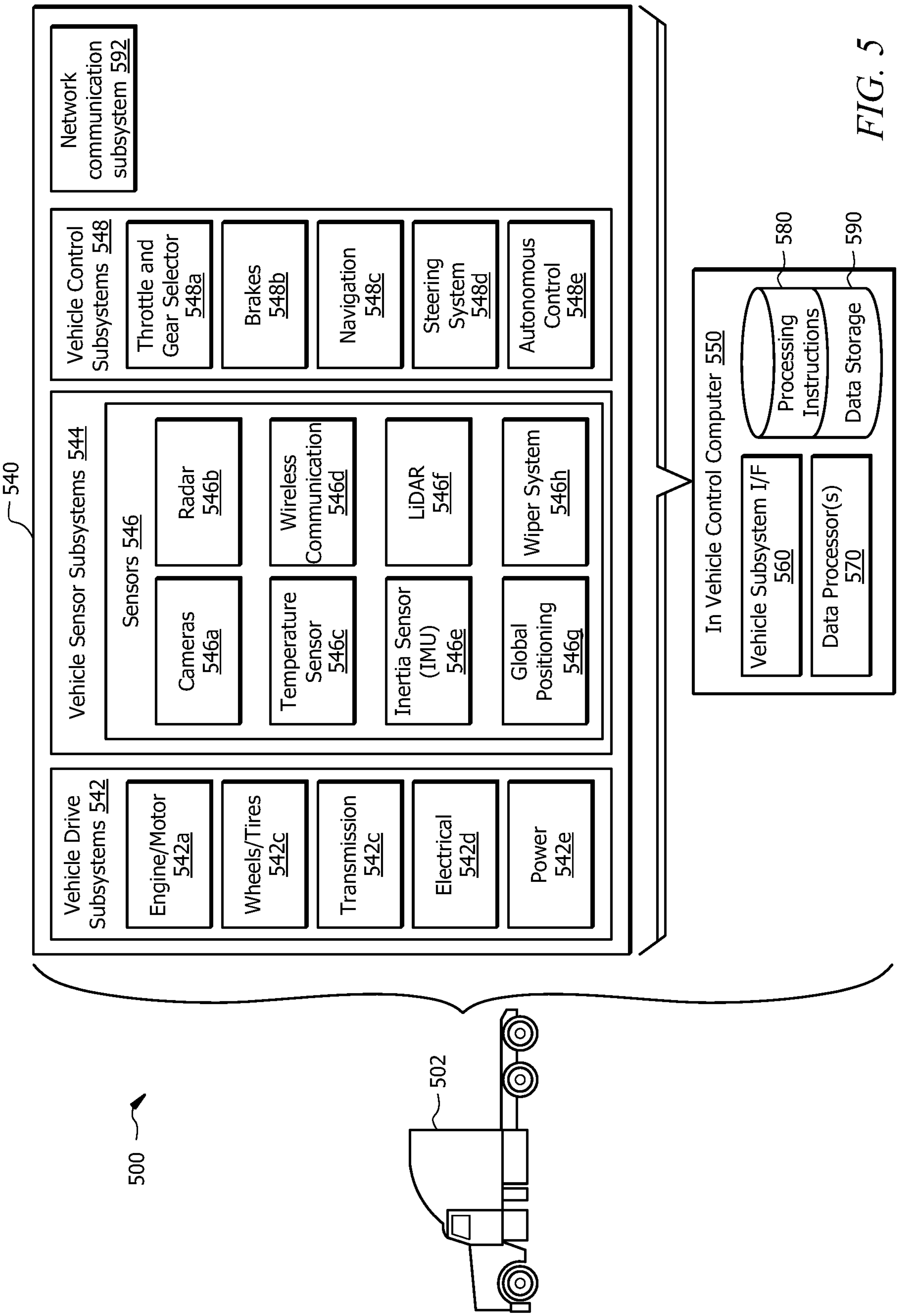
FIG. 5 illustrates a block diagram of an example autonomous vehicle configured to implement autonomous driving operations.

In certain embodiments, the autonomous vehicle 502 may include a semi-truck tractor unit attached to a trailer to transport cargo or freight from one location to another location (see FIG. 5). The autonomous vehicle 502 is generally configured to travel along a road in an autonomous mode. The autonomous vehicle 502 may navigate using a plurality of components described in detail in FIGS. 5-7. The operation of the autonomous vehicle 502 is described in greater detail in FIGS. 5-7. The corresponding description below includes brief descriptions of certain components of the autonomous vehicle 502.

Control device 550 may be generally configured to control the operation of the autonomous vehicle 502 and its components and to facilitate autonomous driving of the autonomous vehicle 502. The control device 550 may be further configured to determine a pathway in front of the autonomous vehicle 502 that is safe to travel and free of objects or obstacles, and navigate the autonomous vehicle 502 to travel in that pathway. This process is described in more detail in FIGS. 5-7. The control device 550 may generally include one or more computing devices in signal communication with other components of the autonomous vehicle 502 (see FIG. 5). In this disclosure, the control device 550 may interchangeably be referred to as an in-vehicle control computer 550.

The control device 550 may be configured to detect objects on and around a road traveled by the autonomous vehicle 502 by analyzing the sensor data 130 and/or map data 134. For example, the control device 550 may detect objects on and around the road by implementing object detection machine learning modules 132. The object detection machine learning modules 132 may be implemented using neural networks and/or machine learning algorithms for detecting objects from images, videos, infrared images, point clouds, audio feed, Radar data, etc. The object detection machine learning modules 132 are described in more detail further below. The control device 550 may receive sensor data 130 from the sensors 546 positioned on the autonomous vehicle 502 to determine a safe pathway to travel. The sensor data 130 may include data captured by the sensors 546.

Sensors 546 may be configured to capture any object within their detection zones or fields of view, such as landmarks, lane markers, lane boundaries, road boundaries, vehicles, pedestrians, road/traffic signs, among others. In some embodiments, the sensors 546 may be configured to detect rain, fog, snow, and/or any other weather condition. The sensors 546 may include a detection and ranging (LiDAR) sensor, a Radar sensor, a video camera, an infrared camera, an ultrasonic sensor system, a wind gust detection system, a microphone array, a thermocouple, a humidity sensor, a barometer, an inertial measurement unit, a positioning system, an infrared sensor, a motion sensor, a rain sensor, and the like. In some embodiments, the sensors 546 may be positioned around the autonomous vehicle 502 to capture the environment surrounding the autonomous vehicle 502. See the corresponding description of FIG. 5 for further description of the sensors 546.

Control Device

The control device 550 is described in greater detail in FIG. 5. In brief, the control device 550 may include the processor 122 in signal communication with the memory 126 and a network interface 124. The processor 122 may include one or more processing units that perform various functions as described herein. The memory 126 may store any data and/or instructions used by the processor 122 to perform its functions. For example, the memory 126 may store software instructions 128 that when executed by the processor 122 causes the control device 550 to perform one or more functions described herein.

The processor 122 may be one of the data processors 570 described in FIG. 5. The processor 122 comprises one or more processors. The processor 122 may be any electronic circuitry, including state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 may be communicatively coupled to and in signal communication with the network interfaces 124*a,b* and memory 126. The one or more processors may be configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 128 and/or AVCG manager 140 to implement the functions disclosed herein, such as some or all of those described with respect to FIGS. 1-7. In some embodiments, the function described herein is implemented using logic units, FPGAs, ASICs, DSPs, or any other suitable hardware or electronic circuitry. For example, the processor 122 may perform one or more operations of the operational flow of the system 100 described in FIG. 1, one or more operations of the method 200 described in FIG. 2, one or more operations of the method 300 described in FIG. 3, and/or one or more operations described in FIGS. 5-7.

Each of the network interfaces 124*a,b* may be a component of the network communication subsystem 592 described in FIG. 5. Each of the network interfaces 124*a,b* may be an instance of a network interface 124. Each of the network interfaces 124*a* and 124*b* may be configured to enable wired and/or wireless communications. Each of the network interfaces 124*a* and 124*b* may be configured to communicate data between the autonomous vehicle 502 and other devices, systems, or domains. For example, each of the network interfaces 124*a* and 124*b* may comprise a near-field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using each of the network interfaces 124*a* and 124*b*. Each of the network interfaces 124*a* and 124*b* may be configured to use any suitable type of communication protocol as would be appreciated by one of ordinary skill in the art.

The first network interface 124*a* may be associated with and/or subscribed to the first network provider 150*a*. For example, the first network interface 124*a* may be provided with a first subscriber identity module (SIM) resource, that is associated with the first network provider 150*a*, when the global system for mobile communications (GSM) protocol is used by the first network provider 150*a*. The first SIM resource may be a SIM card, a physical SIM card, or an electronic SIM (e-SIM), among others, for example. In another example, the first network interface 124*a* may be subscribed to the first network provider 150*a* when the first network provider 150*a* unlocks communication protocols and channels for the first network interface 124*a*, when the code division multiple access (CDMA) protocol is used by the first network provider 150*a*. In this manner, the first network interface 124*a* may be configured to communicate with other components of the system 100 (e.g., the base station 152*a*) via network channels provided by the first network provider 150*a*.

The second network interface 124*b* may be associated with and/or subscribed to the second network provider 150*b*. For example, the second network interface 124*b* may be provided with a second SIM resource, that is associated with the second network provider 150*b*, when the GSM protocol is used by the second network provider 150*b*. The second SIM resource may be a SIM card, a physical SIM card, or an e-SIM, among others, for example. In another example, the second network interface 124*b* may be subscribed to the second network provider 150*b* when the second network provider 150*b* unlocks communication protocols and channels for the second network interface 124*b*, when the CDMA protocol is used by the second network provider 150*b*. Each of the first network provider 150*a* and the second network provider 150*b* may be a carrier provider that can use GSM, CDMA, fourth-generation (4G), fifth-generation (5G), New Radio (NR), Long term Evolution (LTE), etc. communication protocols. In this manner, the second network interface 124*b* may be configured to communicate with other components of the system 100 (e.g., the base station 152*b*) via network channels provided by the second network provider 150*b*.

The memory 126 may be one of the data storages 590 described in FIG. 5. The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc. The memory 126 may store any of the information described in FIGS. 1-7 along with any other data, instructions, logic, rules, or code operable to implement the function(s) described herein when executed by processor 122. For example, the memory 126 may store software instructions 128, sensor data 130, object detection machine learning modules 132, map data 134, routing plan 136, driving instructions 138, AVCG manager 140, cellular information 142, network information 144, location data 146, timestamps 148, cellular map 104, table of measurements 410*a*-*b*, and/or any other data/instructions. The software instructions 128 include code that when executed by the processor 122 causes the control device 550 to perform the functions described herein, such as some or all of those described in FIGS. 1-7. The memory 126 comprises one or more disks, tape drives, or solid-state drives, and may be used as an over-flow data storage device to store programs when such programs are selected for execution, and to store instructions and data that are read during program execution.

Object detection machine learning modules 132 may be implemented by the processor 122 executing software instructions 128, and may be generally configured to detect objects and obstacles from the sensor data 130. The object detection machine learning modules 132 may be implemented using neural networks and/or machine learning algorithms for detecting objects from any data type, such as images, videos, infrared images, point clouds, audio feed, Radar data, etc.

In some embodiments, the object detection machine learning modules 132 may be implemented using machine learning algorithms, such as Support Vector Machine (SVM), Naive Bayes, Logistic Regression, k-Nearest Neighbors, Decision Trees, or the like. In some embodiments, the object detection machine learning modules 132 may utilize a plurality of neural network layers, convolutional neural network layers, Long-Short-Term-Memory (LSTM) layers, Bi-directional LSTM layers, recurrent neural network layers, and/or the like, in which weights and biases of these layers are optimized in the training process of the object detection machine learning modules 132. The object detection machine learning modules 132 may be trained by a training dataset that may include samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, audio feed, Radar data, etc. labeled with object(s) in each sample data. The object detection machine learning modules 132 may be trained, tested, and refined by the training dataset and the sensor data 130. The object detection machine learning modules 132 use the sensor data 130 (which are not labeled with objects) to increase their accuracy of predictions in detecting objects. Similar operations and embodiments may apply for training the object detection machine learning modules 132 using the training dataset that includes sound data samples each labeled with a respective sound source and a type of sound. For example, supervised and/or unsupervised machine learning algorithms may be used to validate the predictions of the object detection machine learning modules 132 in detecting objects in the sensor data 130.

Map data 134 may include a virtual map of a city or an area that includes the road traveled by an autonomous vehicle 502. In some examples, the map data 134 may include the map 658 and map database 636 (see FIG. 6 for descriptions of the map 658 and map database 636). The map data 134 may include drivable areas, such as roads, paths, highways, and undrivable areas, such as terrain (determined by the occupancy grid module 660, see FIG. 6 for descriptions of the occupancy grid module 660). The map data 134 may specify location coordinates of road signs, lanes, lane markings, lane boundaries, road boundaries, traffic lights, obstacles, etc.

Routing plan 136 may be a plan for traveling from a start location (e.g., a first autonomous vehicle launchpad/landing pad) to a destination (e.g., a second autonomous vehicle launchpad/landing pad). For example, the routing plan 136 may specify a combination of one or more streets, roads, and highways in a specific order from the start location to the destination. The routing plan 136 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 136 may include other information about the route from the start position to the destination, such as road/traffic signs in that routing plan 136, etc.

Figure 6:
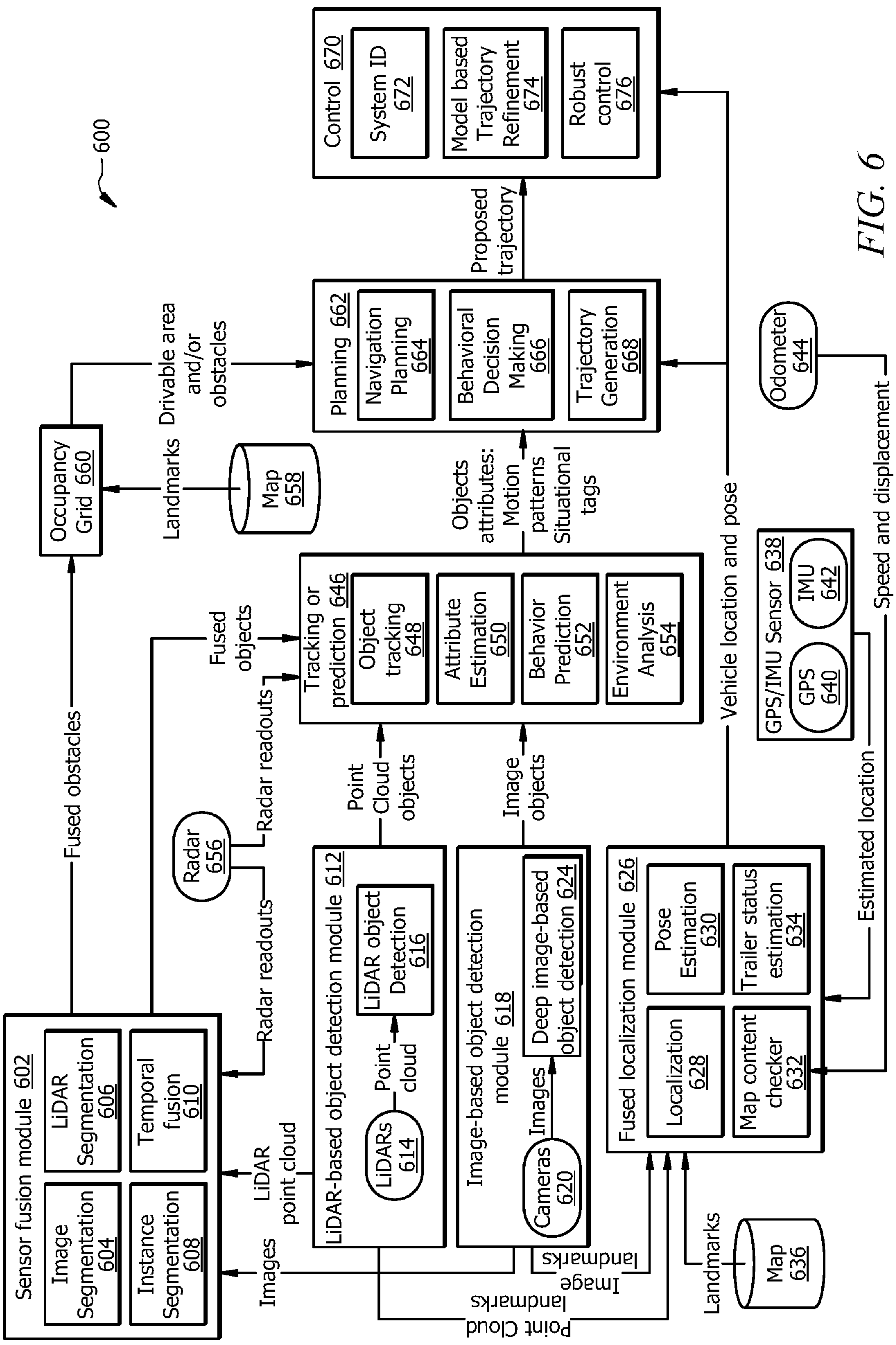
FIG. 6 illustrates an example system for providing autonomous driving operations used by the autonomous vehicle of FIG. 5.

Driving instructions 138 may be implemented by the planning module 662 (See descriptions of the planning module 662 in FIG. 6.). The driving instructions 138 may include instructions and rules to adapt the autonomous driving of the autonomous vehicle 502 according to the driving rules of each stage of the routing plan 136. For example, the driving instructions 138 may include instructions to stay within the speed range of a road traveled by the autonomous vehicle 502, adapt the speed of the autonomous vehicle 502 with respect to observed changes by the sensors 546, such as speeds of surrounding vehicles, objects within the detection zones of the sensors 546, etc.

The AVCG manager 140 is implemented in a software instruction that when executed by the processor 122, causes the control device 550 to execute one or more instructions described herein. For example, when the AVCG manager 140 is executed, the control device 550 performs the collection and detection of cellular information 142 and network information 144.

The cellular information 142 provides information about cellular connectivity coverage and conditions along a road 102 as the autonomous vehicle 502 travels along the road 102. In the illustrated example, the cellular information 142 includes cellular information 142*a* associated with a first network provider 150*a* and cellular information 142*b* associated with a second network provider 150*b*. In other examples, the cellular information 142 may include any number of cellular information 142 associated with any suitable number of network providers 150.

The cellular information 142*a* comprises information about cellular communication conditions and cellular coverage provided by the first network provider 150*a*. The cellular information 142*a* is determined based on cellular communication conditions determined from communications with the first network provider 150*a*. The control device 550 (e.g., via the AVCG manager 140) determines the cellular information 142*a* based on the cellular network communications 143*a* with the base station 152*a* via the network interface 124*a* that is subscribed to the first network provider 150*a*. The cellular information 142*a* may include a cellular signal bandwidth, a cellular signal strength, a cellular signal-to-noise ratio, a cellular signal-to-interference and noise ratio, a cellular data package loss rate, a cellular signal latency, a cellular signal round-trip time, a cellular signal bit rate, among other cellular signal measurements and characteristics associated with cellular connections via the network interface 124*a* and network provider 150*a*.

The cellular information 142*b* comprises information about cellular communication conditions and cellular coverage provided by the second network provider 150*b*. The cellular information 142*b* is determined based on cellular communication conditions determined from communications with the second network provider 150*b*. The control device 550 (e.g., via the AVCG manager 140) determines the cellular information 142*b* based on the cellular network communications 143*b* with the base station 152*b* via the network interface 124*b* that is subscribed to and/or associated with the second network provider 150*b*. The cellular information 142*b* may include a cellular signal bandwidth, a cellular signal strength, a cellular signal-to-noise ratio, a cellular signal-to-interference and noise ratio, a cellular data package loss rate, a cellular signal latency, a cellular signal round-trip time, a cellular signal bit rate, among other cellular signal measurements and characteristics associated with cellular connections via the network interface 124*b* and network provider 150*b*.

Each cellular information 142 provides information about a one-hop cellular network communication between the control device 550 and a respective base station 152*a-b*. The cellular information 142*a* provides cellular signal measurements and characteristics about a one-hop cellular network communication between the control device 550 and the base station 152*a*. The cellular information 142*b* provides cellular signal measurements and characteristics about a one-hop cellular network communication between the control device 550 and the base station 152*b*.

The network information 144 includes information about network connectivity coverage and conditions along a road 102 as the autonomous vehicle 502 travels along the road 102. The network information 144 may be with respect to end-to-end network communication between the control device 550 and the remote server 154 via multiple hops—meaning data routing among multiple access points (e.g., base stations 152), network devices, and the like that are along the network path connecting the control device 550 and the remote server 154. In other words, the network information 144 may be detected based on network communications 143*c* between the control device 550 and the remote server 154. The network information 144 may be associated with communications according to one or more radio access technologies (RATs) comprising 4G, 5G NR, LTE, WIFI, and Bluetooth, among others. The network information 144 may include a network communication bandwidth, a network communication signal strength, a network communication signal-to-noise ratio, a network communication data package loss rate, a network communication latency, a network communication round-trip time, and a network communication signal bit rate, among other network measurements and conditions.

Location data 146 may include a Global Positioning System (GPS) location coordinate of the autonomous vehicle 502 at a given location. The control device 550 may determine the location data 146 using a GPS sensor (546*g* in FIG. 5).

The timestamp 148 may indicate a time when a particular data, including one or more of sensor data 130, cellular information 142, network information 144, location data 146, etc. is captured. For example, if a first sensor data 130 is captured at a first timestamp 148, the first sensor data 130 may be associated with the first timestamp 148, if a second sensor data 130 is captured at a second timestamp 148, the second sensor data 130 may be associated with the second timestamp 148, and so on. In another example, if a first cellular information 142*a* is captured at a first timestamp 148, the first cellular information 142*a* may be associated with the first timestamp 148, if a second cellular information 142*b* is captured at a second timestamp 148, the second cellular information 142*b* may be associated with the second timestamp 148, and so on. In another example, if a first network information 144 is captured at a first timestamp 148, the first network information 144 may be associated with the first timestamp 148, if a second network information 144 is captured at a second timestamp 148, the second network information 144 may be associated with the second timestamp 148, and so on. In another example, if a first location data 146 is captured at a first timestamp 148, the first location data 146 may be associated with the first timestamp 148, if a second location data 146 is captured at a second timestamp 148, the second location data 146 may be associated with the second timestamp 148, and so on.

Base Station

Each of the base stations 152*a* and 152*b* may be a network node, an access point, an NB, an eNB, eNodeB, gNB, or other types of wireless access points, and is generally configured to enable wireless communication between the components of the system 100. Each of the base stations 152*a* and 152*b* may serve communications to devices within a serving cell that defines a corresponding coverage area of the serving cell. Each of the network providers 150*a* and 150*b* may be an instance of a network provider 150. The network provider 150 may be an entity that provides network communication channels to its subscribers.

Each of the base stations 152*a* and 152*b* may be a serving base station for vehicles equipped with wireless communication (such as autonomous vehicles 502, non-autonomous vehicles equipped with the AVCG manager 140 and/or a network interface 124, semi-autonomous vehicles equipped with the AVCG manager 140 and/or a network interface 124, etc.), user devices, mobile devices, and the like. When a vehicle is within a coverage area associated with a particular base station 152*a,b*, the base station 152*a,b* provides communication coverage to the vehicle. For example, as a vehicle travels along the road 102, its communication device (e.g., network interface 124*a,b*) may communicate data to its respective serving base station 152*a,b*. As the vehicle travels between cells, base stations 152*a*, and *b* perform the handover procedure to hand over facilitating the communication of the communication device associated with the vehicle. In certain embodiments, each of the base stations 152*a* and 152*b* may be configured to facilitate cellular networks, 4G, 5G, 5G NR, LTE, 3rd Generation Partnership Project (3GPP), and other wireless protocols.

In certain embodiments, each base station 152*a,b* may also include a transceiver, a transmission filter, a receiving filter, memory resources, and processing resources to facilitate operations of each base station 152*a,b*, such as to transmit and receive cellular signals, network signals, mobile communication signals, and/or any other signals. For example, the transceiver may include a processing circuitry configured to transmit signals to mobile devices, control devices 550, other base stations, and to other communication systems to enable mobile communication and access to the network 110. The transmission filter includes a bandpass filter with a strict passband. The passband corresponds to the bandwidth that is assigned for the base station 152*a,b*. Any signals with frequencies outside the passband are filtered so that they are not transmitted from the base station 152*a,b*. The receiving filter includes a bandpass filter configured to ensure that the base station 152*a,b* will reject any signals outside of its designated bandwidth. Accordingly, the receiving filter is a bandpass filter with a strict bandpass corresponding to the assigned bandwidth of the base station 152*a,b*. The memory resources include one or more computer-readable media that store software instructions for establishing a communication network with the base station 152*a,b*. The processing resources may include one or more processing circuitry configured to execute the software instructions stored in the one or more computer-readable media of the memory resources to perform wireless communication functions of the base station 152*a,b*.

Remote Server

The remote server 154 is generally a device that is configured to provide software and/or hardware resources to other components of the system 100. In certain embodiments, the remote server 154 may be in a cloud platform in a remote server farm. In certain embodiments, the remote server 154 may be in a remote data center. The remote server 154 may be a database server or a network server configured to return messages (e.g., acknowledgment messages) to the control device 550 in response to receiving a data package requesting to return an acknowledgment message. The control device 550 (e.g., via the AVCG manager 140) may communicate with the remote server 154 to establish the network communication path 143*c* with the remote server 154. Based on the network communications 143*c* between the control device 550 and the remote server 154, the control device 550 may determine the network information 144. For example, the control device 550 may determine a round-trip time included in the network information 144, where the round-trip time is the time from when the control device 550 transmits a data package requesting an acknowledgment message to the remote server 154 until the acknowledgment message is received at the control device 550.

Oversight Server

Oversight server 160 may include one or more processing devices and is generally configured to oversee the operations of the autonomous vehicle 502 while they are in transit and oversee the traveling of the autonomous vehicle 502 and while they are at a terminal. The oversight server 160 may provide software and/or hardware resources (e.g., map data 134, routing plans 136, commands 178, start collection message 172, stop collection message 174, routing recommendations, feedback from a remote operator on autonomous vehicle navigation, etc.) to the autonomous vehicles 502. The oversight server 160 may comprise a processor 162, a network interface 164, a user interface 166, and a memory 168. The components of the oversight server 160 are operably coupled with each other. The processor 162 may include one or more processing units that perform various functions of the oversight server 160. The memory 168 may store any data and/or instructions used by the processor 162 to perform its functions. For example, the memory 168 may store software instructions 170 that when executed by the processor 162 cause the oversight server 160 to perform one or more functions described herein. The oversight server 160 may be configured as shown or in any other suitable configuration.

In one embodiment, the oversight server 160 may be implemented by a cluster of computing devices that may serve to oversee the operations of the autonomous vehicle 502. For example, the oversight server 160 may be implemented by a plurality of computing devices using distributed computing and/or cloud computing systems. In another example, the oversight server 160 may be implemented by a plurality of computing devices in one or more data centers. As such, in one embodiment, the oversight server 160 may include more processing power than the control device 550. The oversight server 160 is in signal communication with the autonomous vehicle 502 and its components (e.g., the control device 550).

Processor 162 comprises one or more processors. The processor 162 may be any electronic circuitry, including state machines, one or more CPU chips, logic units, cores (e.g., a multi-core processor), FPGAs, ASICs, or DSPs. The processor 162 may be a programmable logic device, a microcontroller, a microprocessor, or any suitable combination of the preceding. The processor 162 may be communicatively coupled to and in signal communication with the network interface 164, user interface 166, and memory 168. The one or more processors are configured to process data and may be implemented in hardware or software. For example, the processor 162 may be 8-bit, 16-bit, 32-bit, 64-bit or of any other suitable architecture. The processor 162 may include an ALU for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 170 to implement the functions disclosed herein, such as some or all of those described with respect to FIGS. 1-7. In some embodiments, the function described herein may be implemented using logic units, FPGAs, ASICs, DSPs, or any other suitable hardware or electronic circuitry. For example, the processor 162 may perform one or more operations of the operational flow of the system 100 described in FIG. 1 and/or one or more operations of the method 200 described in FIG. 2 and/or one or more operations of the method 300 described in FIG. 3.

Network interface 164 may be configured to enable wired and/or wireless communications of the oversight server 160. The network interface 164 may be configured to communicate data between the oversight server 160 and other devices, servers, autonomous vehicles 502, systems, or domains. For example, the network interface 164 may comprise an NFC interface, a Bluetooth interface, a Zigbee interface, a Z-wave interface, an RFID interface, a WIFI interface, a LAN interface, a WAN interface, a PAN interface, a modem, a switch, and/or a router. The processor 162 may be configured to send and receive data using the network interface 164. The network interface 164 may be configured to use any suitable type of communication protocol as would be appreciated by one of ordinary skill in the art.

User interfaces 166 may include one or more user interfaces that are configured to interact with users, such as a remote operator. The remote operator may access the oversight server 160 via a communication path. In certain embodiments, the user interfaces 166 may include peripherals of the oversight server 160, such as monitors, keyboards, mouse, trackpads, touchpads, microphones, webcams, speakers, and the like. In certain embodiments, the user interface 166 may include a graphical user interface, a software application, or a web application. The remote operator may use the user interfaces 166 to access the memory 168 to review any data stored in the memory 168. The remote operator may confirm, update, and/or override the routing plan 136, map data 134, commands 178, start collection message 172, stop collection message 174, and/or any other data stored in memory 168.

Memory 168 may be volatile or non-volatile and may comprise ROM, RAM, TCAM, DRAM, and SRAM. The memory 168 may include one or more of a local database, cloud database, NAS, etc. Memory 168 may store any of the information described in FIGS. 1-7 along with any other data, instructions, logic, rules, or code operable to implement the function(s) described herein when executed by processor 162. For example, the memory 168 may store software instructions 170, sensor data 130, object detection machine learning module 132, map data 134, routing plan 136, driving instructions 138, cellular map 104, start collection message 172, stop collection message 174, network communication requirements 176, commands 178, and/or any other data/instructions. The software instructions 170 may include code that when executed by the processor 162 causes the oversight server 160 to perform the functions described herein, such as some or all of those described in FIGS. 1-7. The memory 168 comprises one or more disks, tape drives, or solid-state drives, and may be used as an over-flow data storage device, to store programs when such programs are selected for execution, and to store instructions and data that are read during program execution.

The cellular map 104 (also referred to herein as a network coverage map) presents network connectivity coverage at least along the road 102 and/or any road associated with cellular information 142 and/or network information 144. In certain embodiments, the cellular map 104 may be static, such that each static cellular map 104 may indicate the network coverage at a respective timestamp 148. In other words, each static cellular map 104 may be associated with a respective timestamp 148 that is also associated with respective cellular information 142, network information 144, and location data 146. For example, for cellular information 142 and network information 144 that are captured and associated with a first timestamp 148, a first cellular map 104 is generated indicating the network coverage at the first timestamp 148. In another example, for cellular information 142 and network information 144 that are captured and associated with a second timestamp 148, a second cellular map 104 is generated indicating the network coverage at the second timestamp 148.

Each cellular map 104 may be represented by a different image showing the determined network coverage along the road 102 at different timestamps 148. For example, the first cellular map 104 associated with the first timestamp may be represented by a first image showing the determined network coverage along the road 102 at the first timestamp, and the second cellular map 104 associated with the second timestamp may be represented by a second image showing the determined network coverage along the road 102 at the second timestamp. Other cellular maps 104 may be generated similarly to show network coverage at other timestamps. In this manner, the oversight server 160 may generate multiple static cellular maps 104. This process is described in great detail further below in conjunction with the discussion of the operational flow of the system 100.

The network coverage and connectivity condition at various locations in the cellular map 104 may be represented by illustrative dots. Example cellular maps 104 illustrating network coverage provided by the network providers 150*a-b* are illustrated in FIGS. 4A-B.

Figure 4A:
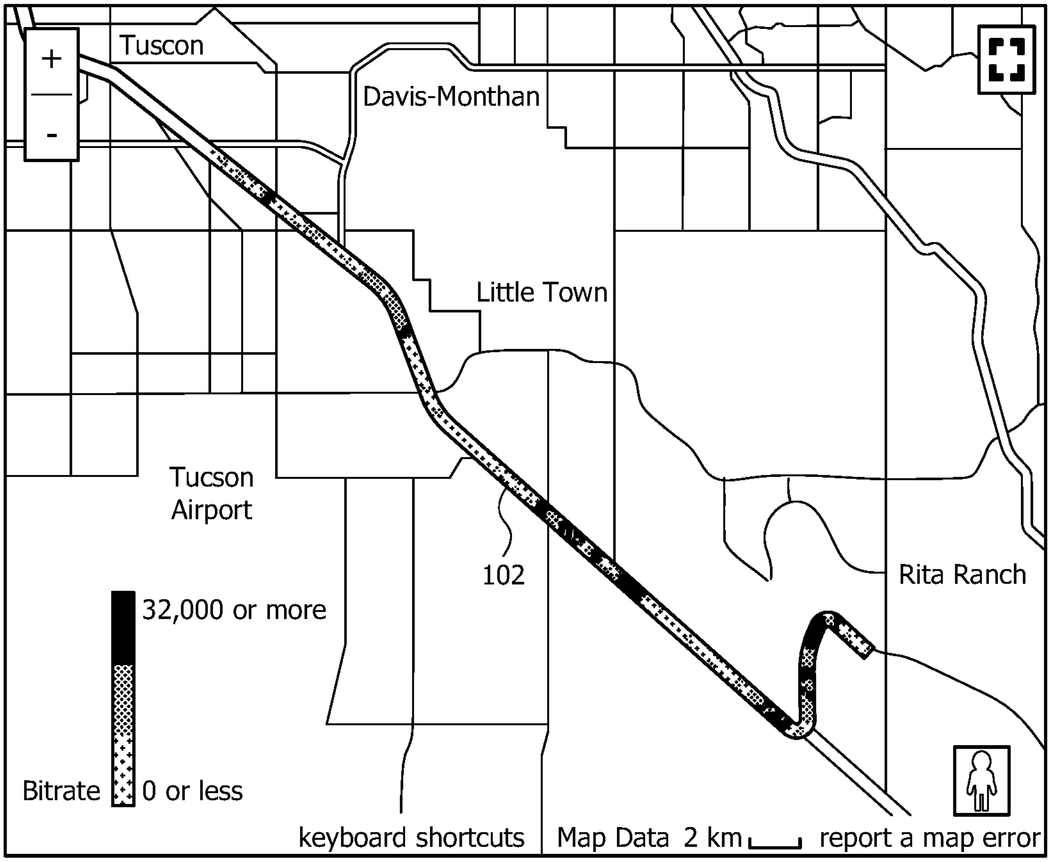
FIGS. 4A and 4B illustrate example cellular maps illustrating network coverage by multiple network providers.
Figure 4B:
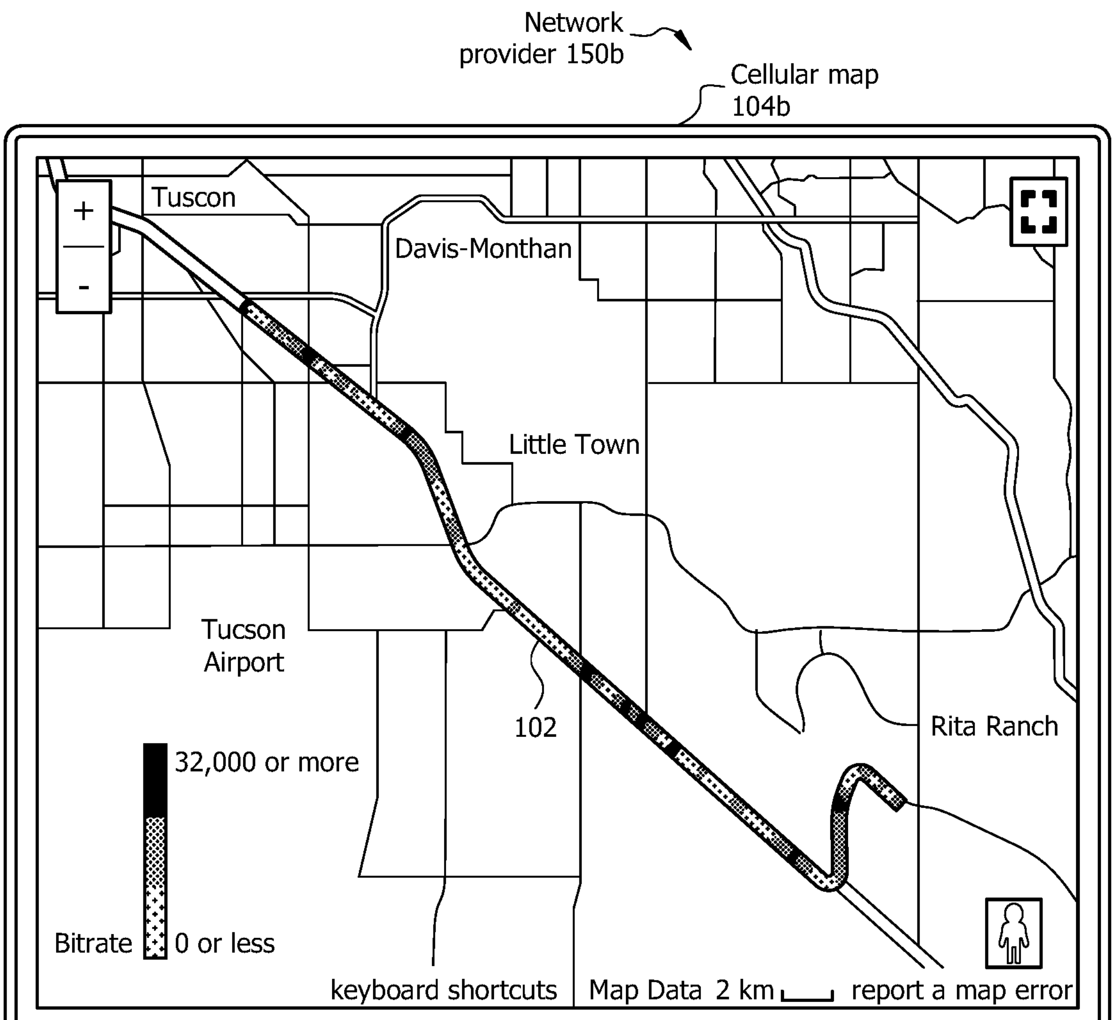

Referring to FIG. 4A, a first cellular map 104*a* is shown that illustrates the network coverage provided by the first network provider 150*a* along a road 102. Referring to FIG. 4B, a second cellular map 104*b* is shown that illustrates the network coverage provided by the second network provider 150*b* along the road 102. As can be seen in the example cellular map 104*a-b*, the network communication bitrate measurements provided by the network providers 150*a-b* are indicated with dots with varying gray-scale colors. For example, geographical locations with the least network communication bitrates are shown with the white or least gray colored dots along the road 102, and geographical locations with the most network communication bitrates are shown with dark or most black colored dots along the road 102. Each dot may be illustrated with particular characteristics that show the network coverage measurements at a respective location. The particular characteristics may include a color of a dot, a size of a dot, a shape of a dot, and the like.

Below each example of cellular maps 104*a-b*, a table of measurements 410*a-b* that indicates timestamps, location, and respective measured bitrate provided a respective network provider 150*a-b* is shown. In FIG. 4A, the table of measurements 410*a* indicates the timestamps 148*a* and locations 146*a* when and where the respective bitrate 412*a* is measured along the road 102, where the bitrates 412*a* are associated with communications provided by the network provider 150*a*. In FIG. 4B, the table of measurements 410*b* indicates the timestamps 148*b* and locations 146*b* when and where the respective bitrate 412*b* is measured along the road 102, where the bitrates 412*b* are associated with communications provided by the network provider 150*b*. In certain embodiments, the network coverage provided by the network providers 150*a* and 150*b* may be superimposed on one cellular map 104. In certain embodiments, the network coverage provided by the network providers 150*a-b* may be shown in different cellular maps 104, similar to cellular maps 104*a* and *b*.

Referring back to FIG. 1, the network communication requirements 176 may be provided by the oversight server 160. The network communication requirements 176 may be configured by a remote operator, for example. The network communication requirements 176 may include a threshold network communication bandwidth, a threshold signal strength, a threshold signal-to-noise ratio, a threshold data package loss rate, a threshold latency, a threshold round-trip time, and a threshold signal bit rate among other cellular signal measurements and characteristics.

Operational Flow for Generating the Cellular Map

Detecting Cellular Information and Network Information

The operational flow of the system 100 may begin when the control device 550 (e.g., AVCG manager 140) initiates detecting cellular information 142 and network information 144. In certain embodiments, the control device 550 (e.g., AVCG manager 140) may begin the detection of the cellular information 142 and the network information 144 in response to receiving a start collection message 172 from the oversight server 160.

In an example scenario, assume that the autonomous vehicle 502 is traveling along the road 102 and while traveling, the control device 550 receives the start collection message 172 from the oversight server 160. In response, the AVCG manager 140 may initiate network communications 143*a* to the base station 152*a* via the network interface 124*a*. In response to the network communication 143*a* being established, the AVCG manager 140 may detect the cellular information 142*a* based on detecting the signal strength, bandwidth, round-trip time, and signal-to-noise ratio, among other measurements described above with respect to the first network provider 150*a*.

Similarly, the AVCG manager 140 may initiate network communications 143*b* to the base station 152*b* via the network interface 124*b*. In response to the network communication 143*b* being established, the AVCG manager 140 may detect the cellular information 142*b* based on detecting the signal strength, bandwidth, round-trip time, and signal-to-noise ratio, among other measurements described above with respect to the first network provider 150*b*.

The AVCG manager 140 may initiate network communications 143*c* to the remote server 154 via network interfaces 124*a-b*, another network interface 124 that is not necessarily subscribed to the first or second network provider 150*a,b*, and may use any suitable wireless protocol, such as LAN, WAN, etc. via the network 110. In response to the network communication 143*c* being established, the AVCG manager 140 may detect the network information 144 based on detecting the signal strength, bandwidth, round-trip time, and signal-to-noise ratio, among other measurements described above. The network communications 143*a-c* may be interchangeably referred to herein as network channels or network paths.

Each of the detected cellular information 142*a-b* and network information 144 may be associated with a respective timestamp window 148. The AVCG manager 140 may also detect the location data 146 that indicates the GPS location of the autonomous vehicle 502. The detected location data 146 may also be associated with a respective timestamp window 148.

Creating a Cellular Map

In response to detecting the cellular information 142 and the network information 144, the AVCG manager 140 communicates the detected cellular information 142, network information 144, and location data 146, each associated with a respective timestamp window 148 to the oversight server 160. The oversight server 160 receives the cellular information 142, network information 144, and location data 146, each associated with a respective timestamp window 148.

The oversight server 160 may analyze the received data and determine a network coverage along the road 102 that is traveled and/or to be traveled by the autonomous vehicle 502 based on the received data. In this process, the oversight server 160 determines the location of the autonomous vehicle 502 on the road 102 based on the location data 146. The oversight server 160 also determines at what timestamp window 148 each of the location data 146 and the cellular information 142 and the network information 144 is captured. The oversight server 160 may map or associate the location of the autonomous vehicle 502 with the cellular information 142 and the network information 144 that are associated with a respective timestamp window 148. Based on the operation, the oversight server 160 may create the cellular map 104 that shows the network coverage, connectivity, and conditions along the road 102. The generated cellular map 104 may be static—meaning that it is represented by a static image showing the network coverage, connectivity, and conditions along the road 102 at a first timestamp window 148 associated with the detected cellular information 142, network information 144, and location data 146.

In a similar manner, the oversight server 160 may create one or more other static cellular maps 104 that show the network coverage, connectivity, and conditions along the road 102 at different timestamps 148 based on cellular information 142, network information 144, and location data 146 associated with the different timestamp windows 148.

In certain embodiments, the oversight server 160 may store the cellular maps 104 in a local memory 168. The remote operator may access the oversight server 160 using user interfaces 166 of the oversight server 160. The remote operator may use the user interfaces 166 to access the memory 168 to view any data that is available in the memory 168. For example, the remote operator may access the cellular map 104. The cellular map 104 may be displayed on a display screen of the oversight server 160.

The cellular map 104 may be displayed on the user interface 166 (e.g., a software application) that provides searching and filtering capability for each network measurement or characteristics (e.g., signal strength, signal bandwidth, signal-to-noise ratio, bit rate, round-trip time, data package throughput, data package loss, etc.) on the cellular map 104.

For example, the remote operator may operator a search field of the software application to search for geographical areas that have a particular network measurement (e.g., signal strength between −20 decibels (dB) and 0 dB) and filter other areas. In this particular example, indications of network coverage in those geographical areas that have the requested network measurement are shown on the cellular map 104 and other indications of network coverage (in other areas) are filtered (i.e., not shown on the cellular map 104). The remote operator may operate the search field of the software application to search for areas with any combination of network measurements and characteristics on the cellular map 104. In response, only indications of network coverage in those areas that provide the requested network measurement are shown on the cellular map 104 and other indications of network coverage (in other areas) are filtered (i.e., not shown on the cellular map 104).

In certain embodiments, the oversight server 160 may communicate the cellular maps 104 to an accessibility server (not explicitly shown) that is also accessible to remote operators. The remote operator may use the accessibility server to view the cellular map 104 and perform searching for particular network measurements, similar to that described above.

In certain embodiments, the oversight server 160 may communicate the stop collection message 174 to the control device 550, where the stop collection message 174 indicates to stop the collection and detection of the cellular information 142 and network information 144. In response, the control device 550 may stop the collection and detection of the cellular information 142 and network information 144.

Dynamic Switching Between Network Providers

In certain embodiments, the control device 550 may perform dynamic switching between network providers 150*a-b* to reduce (or prevent) network interruptions at the control device 550. In this process, the control device 550 may determine which network provider 150*a-b* (or network communication provided by each network provider 150*a-b*) does not satisfy network communication requirements 176 for data communications of the autonomous vehicle 502. For example, with respect to the first network provider 150*a*, the control device 550 may compare the network communication conditions indicated by the first cellular information 142*a* (associated with the first network provider 150*a*) to the network communication requirements 176. If the control device 550 determines that the network communication conditions indicated by the first cellular information 142*a* do not satisfy the network communication requirements 176, the control device 550 may determine that the first network provider 150*a* does not satisfy the network communication requirements 176. For example, if the control device 550 determines that more than a threshold percentage of network communicating conditions and measurements indicated by the first cellular information 142*a* (e.g., more than 80%, 85%, etc.) are less than counterpart measurements indicated by the network communication requirements 176, the control device 550 may determine that the first network provider 150*a* des not satisfy the network communication requirements 176. Otherwise, the control device 550 may determine that the first network provider 150*a* satisfies the network communication requirements 176.

In another example, with respect to the second network provider 150*b*, the control device 550 may compare the network communication conditions indicated by the second cellular information 142*b* (associated with the second network provider 150*b*) to the network communication requirements 176. If the control device 550 determines that the network communication conditions indicated by the second cellular information 142*b* do not satisfy the network communication requirements 176, the control device 550 may determine that the second network provider 150*b* des not satisfy the network communication requirements 176. For example, if the control device 550 determines that more than a threshold percentage of network communication conditions and measurements indicated by the second cellular information 142*b* (e.g., more than 80%, 85%, etc.) are less than counterpart measurements indicated by the network communication requirements 176, the control device 550 may determine that the second network provider 150*b* des not satisfy the network communication requirements 176. Otherwise, the control device 550 may determine that the second network provider 150*b* satisfies the network communication requirements 176.

If the control device 550 determines that a network provider 150*a-b* satisfies the network communication requirements 176, the control device 550 may use (e.g., dynamically switch to) the determined network provider for data communications to other devices, systems, etc. such as data communications to the oversight server 160. In response to switching to the determined network provider, the control device 550 may route any data, such as sensor data 130, the status of the autonomous vehicle 502, etc. to the oversight server 160 via the selected network provider. The oversight server 160 may perform similar operations to perform the dynamic switching between the network providers 150*a,b* and instruct the control device 550 to dynamically switch to a particular network provider 150*a,b* that is determined to provide more optimal network coverage.

Mitigating Network Dead Zones Along a Road

In certain embodiments, the oversight server 160 may detect areas of network dead zones (e.g., poor network coverage) that does not satisfy the network requirements 176 along a road 102 and mitigate the network dead zones to reduce (or prevent) the network interruptions for one or more autonomous vehicles 502 that are heading toward the network dead zones. In this process, the oversight server 160 may evaluate the cellular map 104 and determine the network coverage provided at each location along a road 102. For example, assume that the oversight server 160 determines that the cellular map 104 indicates a particular network coverage at a particular location of the road 102. Also, assume that the oversight server 160 determines that the particular network coverage at the particular location does not satisfy the network requirements 176 based on comparing each measurement indicated in the particular network coverage with a counterpart measurement indicated in the network requirements 176 and determining that more than a threshold percentage of the measurements indicated in the particular network coverage are less than the counterpart measurements indicated in the network requirements 176.

In response, the oversight server 160 may issue a command 178 that indicates to avoid the particular location of the road 102 and communicate the command 178 to one or more autonomous vehicles 502 that are heading toward the particular location of the road 102. In response to receiving the command 178, the one or more autonomous vehicles 502 may be navigated according to the command 178 by respective control devices 550. For example, the command 178 may include instructions to take a detour, instructions to pull over, and instructions to stop without hindering the traffic, among other navigation instructions in a case by case basis such that the command 178 can be performed by the control device 550 and it would lead to optimizing the network performance of the autonomous vehicle 502 and reducing (or preventing) network interruptions for the autonomous vehicle 502.

Analyzing Network Coverage Across Multiple Trips

In certain embodiments, the oversight server 160 may analyze the network coverage along the road 102 across multiple trips by one or more autonomous vehicles 502 (or non-autonomous vehicles, or semi-autonomous vehicles in which the AVCG manager 140 is installed on a computing device, such as control device 550). In response to analyzing the network coverage along the road 102 across multiple trips, the oversight server 160 may determine inconsistencies among the multiple network coverage, determine the cause of the inconsistencies, and provide a solution to mitigate the inconsistencies (if applicable).

In an example scenario, assume that during a first trip of a first autonomous vehicle 502 along the road 102, the control device 550 may detect a first set of cellular information 142 and a first network information 144 and communicate the detected data to the oversight server 160. Based on the received data, the oversight server 160 determines a first network coverage along the road 102 and generates a first cellular map 104 based on the first network coverage along the road 102, similar to that described above.

On a second trip along the road 102, the control device 550 may detect a second set of cellular information 142 and a second network information 144 that provide information about cellular and network connectivity and conditions along the road 102 during the second trip, similar to that described above with respect to the first set of cellular information 142 and the first network information 144 detected during the first trip along the road 102. The second trip may be done by the first autonomous vehicle 502, another autonomous vehicle 502, or any vehicle that is equipped with the AVCG manager 140. The second set of cellular information 142 may include a third cellular information 142*a* and a fourth cellular information 142*b*. The third cellular information 142*a* is associated with the first network provider 150*a* and includes information about cellular communication conditions during the second trip along the road 102 that is determined from communications via the network interface 124*a* to the base station 152*a*. The fourth cellular information 142*b* is associated with the second network provider 150*b* and includes information about cellular communication conditions during the second trip along the road 102 that is determined from communications via the network interface 124*b* to the base station 152*b*. The second network information 144 may include information about network connectivity and conditions along the road 102 during the second trip. The second network information 144 may be determined from communications with the remote server 154.

The control device 550 (e.g., via the AVCG manager 140) communicates the second set of cellular information 142 and the second network information 144 to the oversight server 160. The oversight server 160 determines the second network coverage along the road 102 based on the received data with respect to the second trip. The oversight server 160 may generate a second cellular map 104 based on the second network coverage along the road 102 for the second trip.

In response, the oversight server 160 may evaluate the network coverages across the first and second trips. In this process, the oversight server 160 may compare the first network coverage along the road 102 associated with the first trip with the second network coverage detected along the road 102 associated with the second trip. In other words, the oversight server 160 may compare the first cellular map 104 with the second cellular map 104.

The oversight server 160 may determine whether the first network coverage corresponds to the second network coverage—i.e., whether the first cellular map 104 corresponds to the second cellular map 104. If the oversight server 160 determines that the first network coverage corresponds to the second network coverage, the oversight server 160 may determine that the first cellular map 104 corresponds to the second cellular map 104. Otherwise, the oversight server 160 may determine that the first cellular map 104 does not correspond to the second cellular map 104. The oversight server 160 may determine that the first cellular map 104 does not correspond to the second cellular map 104 if at least one network measurement or characteristic (as indicated in any of the first set of cellular information 142 and/or the first network information 144 for the first trip) on at least one location along the road 102 in the first cellular map 104 does not match or correspond to the counterpart network measurement or characteristic (as indicated in any of the second set of cellular information 142 and/or the second network information 144 for the second trip). If the oversight server 160 determines that the first cellular map 104 does not correspond to the second cellular map 104, the oversight server 160 may determine that there is a network coverage inconsistency (or anomaly) between the network coverage determined with respect to the first trip and the network coverage determined with respect to the second trip.

The oversight server 160 may determine the cause of the network coverage inconsistency. For example, the oversight server 160 may determine that the cause of the network coverage inconsistency is one or more of a faulty (or an anomalous) network communication device associated with an autonomous vehicle 502 (or a non-autonomous vehicle), a faulty (or out of date) AVCG manager 140, poor network coverage by a network provider 150*a,b*, among others. In one example, in response to detecting the network coverage inconsistency, the oversight server 160 may determine that a network communication device (e.g., network interface 124*a,b*) is anomalous or faulty. To this end, the oversight server 160 may perform the following operations. For example with respect to the first autonomous vehicle 502 (or first vehicle) that performed the first trip, the oversight server 160 may communicate a command to the control device 550 (of the first autonomous vehicle 502 or first vehicle) to execute a diagnostic instruction on the first network communication device, where the diagnostic instruction comprises code configured to determine whether the first network communication device is operational. The first network communication device may be network interface 124*a*, network interface 124*b*, network communication subsystem (592 in FIG. 5), or other components, for example.

The control device 550 (of the first autonomous vehicle 502 or first vehicle) may execute the diagnostic instruction and determine a first result of the diagnostic instruction. The control device 550 (of the first autonomous vehicle 502 or first vehicle) may determine whether the first network communication device is operational based on the result of the diagnostic instruction. If the result of the diagnostic instruction indicates that the first network communication device is operational, the control device 550 (of the first autonomous vehicle 502 or first vehicle) may determine that the first network communication device is not anomalous. Otherwise, it may be determined that the first network communication device is anomalous.

Similar operations can be performed for the second autonomous vehicle 502 (or the second vehicle) that performed the second trip. For example with respect to the second autonomous vehicle 502 (or a second non-autonomous vehicle) that performed the second trip, the oversight server 160 may communicate a command to the control device 550 (associated with the second autonomous vehicle 502 or second non-autonomous vehicle) to execute a diagnostic instruction on the second network communication device. The second network communication device may be network interface 124*a*, network interface 124*b*, network communication subsystem (592 in FIG. 5), or other components, for example.

The control device 550 may execute the diagnostic instruction and determine a second result of the diagnostic instruction. The control device 550 may determine whether the second network communication device is operational based on the result of the diagnostic instruction. If the result of the diagnostic instruction indicates that the second network communication device is operational, the control device 550 may determine that the second network communication device is not anomalous. Otherwise, it may be determined that the second network communication device is anomalous. If it is determined that a particular network communication device is anomalous, the oversight server 160 may determine that the particular network communication needs a maintenance service to address the detected anomaly or failure.

In response, in certain embodiments, the oversight server 160 may communicate an over-the-air software update package to the control device 550 to be installed to address and remedy the detected anomaly or failure at the particular network communication device. The control device 550 may execute the software update package. In certain embodiments, the oversight server 160 may communicate a command to the control device 550 to pull over, stop, reroute to the nearest autonomous vehicle terminal, etc. if the failure is due to hardware failure at the particular network communication device. The control device 550 may perform the received command. In other examples, the oversight server 160 and/or the control device 550 may perform diagnostics on communications with each network provider 150*a,b* to determine whether any of the network providers 150*a,b* provides poor network coverage during a particular trip. The control device 550 may dynamically switch to a particular network provider 150*a,b* that provides more reliable network coverage to reduce (or prevent) network interruptions for the control device 550. The oversight server 160 may update the cellular map 104 to reflect the inconsistency between network coverages during the first trip and the second trip.

Example Method for Detecting Cellular Information and Network Information

Figure 2:
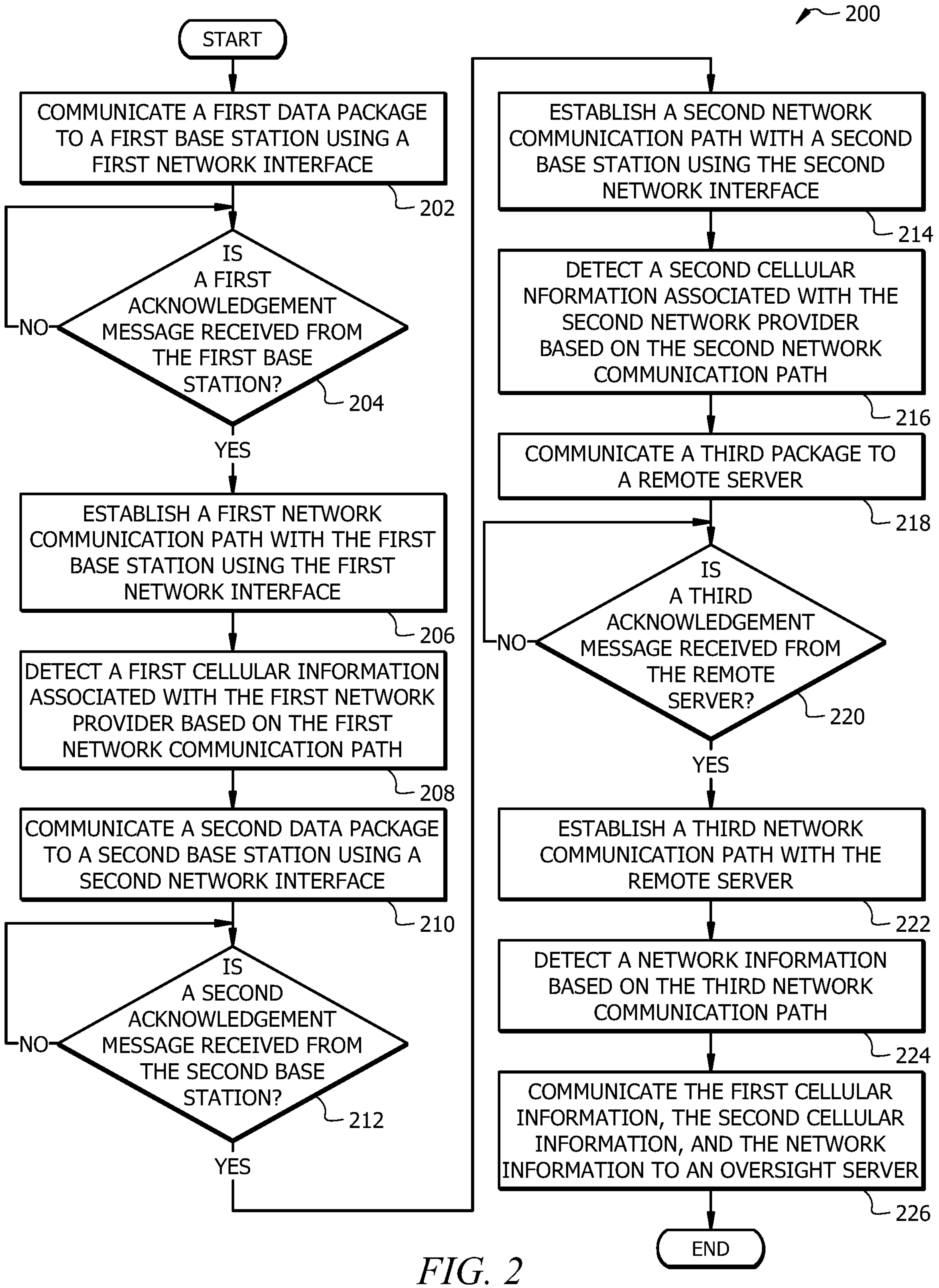
FIG. 2 illustrates an example flowchart of a method for detecting cellular and network information.

FIG. 2 illustrates an example flowchart of a method 200 detecting cellular information 142 and network information 144. Modifications, additions, or omissions may be made to method 200. Method 200 may include more, fewer, or other operations. For example, operations may be performed in parallel or in any suitable order. While at times discussed as the system 100, autonomous vehicle 502, control device 550, oversight server 160, or components of any of thereof performing operations, any suitable system or components of the system may perform one or more operations of the method 200. For example, one or more operations of method 200 may be implemented, at least in part, in the form of software instructions 128, AVCG manager 140, software instructions 170, processing instructions 580, respectively, from FIGS. 1 and 5, stored on non-transitory, tangible, machine-readable media (e.g., one or more memory 126, 168, and data storage 590, respectively, from FIGS. 1 and 5) that when run by one or more processors (e.g., processors 122, 162, 570, respectively, from FIGS. 1 and 5) may cause the one or more processors to perform operations 202-226.

At operation 202, the control device 550 communicates a first data package to the first base station 152*a* using the first network interface 124*a*. In certain embodiments, the method 200 may begin in response to the control device 550 receiving the start collection message 172 from the oversight server 160, as the autonomous vehicle 502 is traveling along the road 102. The first data package may be a message requesting an acknowledgment. At operation 204, the control device 550 determines whether the first acknowledgment message is received from the first base station 152*a*. The first acknowledgment message may indicate that the first data package is received. If it is determined that first acknowledgment message is received from the first base station 152*a*, the method 200 may proceed to operation 206. Otherwise, the method 200 may remain at operation 204 and wait until the acknowledgment message is received from the first base station 152*a*—assuming that the base station 152*a*, the network interface 124*a*, and the network provider 150*a* are operational.

At operation 206, the control device 550 establishes the first network communication path 143*a* with the first base station 152*a* using the first network interface 124*a*. At operation 208, the control device 550 detects the first cellular information 142*a* associated with the first network provider 150*a* based on the first network communication path 143*a*. For example, the first cellular information 142*a* may include cellular signal strength, cellular round-trip time, among other cellular signal characteristics that the first network provider 150*a* provides, similar to that described in FIG. 1. The first cellular information 142*a* may provide information about cellular communication conditions provided by the first network provider 150*a* along the road 102.

At operation 210, the control device 550 communicates a second data package to the second base station 152*b* using the second network interface 124*b*. The second data package may be a message requesting an acknowledgment. At operation 212, the control device 550 determines whether the second acknowledgment message is received from the second base station 152*b*. The second acknowledgment message may indicate that the second data package is received. If it is determined that the second acknowledgment message is received from the second base station 152*b*, the method 200 may proceed to the operation 214. Otherwise, the method 200 may remain at operation 212 and wait until the acknowledgment message is received from the second base station 152*b*—assuming that the base station 152*b*, the network interface 124*b*, and the network provider 150*b* are operational.

At operation 214, the control device 550 establishes a second network communication path 143*b* with the second base station 152*b* using the second network interface 124*b*. At operation 216, the control device 550 detects the second cellular information 142*b* associated with the second network provider 150*b* based on the second network communication path 143*b*. The second cellular information 142*b* may provide information about cellular communication conditions provided by the second network provider 150*b* along the road 102. For example, the second cellular information 142*b* may include cellular signal strength, cellular round-trip time, among other cellular signal characteristics that the second network provider 150*b* provides, similar to that described in FIG. 1.

At operation 218, the control device 550 communicates a third data package to a remote server 154. The control device 550 may communicate the third data package using the first network interface 124*a*, the second network interface 124*b*, or any other network interface (not explicitly shown) that is not subscribed to the first or second network providers 150*a* and *b*, via the network 110. The third data package may be a message requesting acknowledgment.

At operation 220, the control device 550 determines whether a third acknowledgment message is received from the remote server 154. The third acknowledgment message may indicate that the third data package is received. If is it determined that the third acknowledgment message is received from the remote server 154, the method 200 may proceed to operation 222. Otherwise, the method 200 may remain at operation 220 and wait until the third acknowledgment message is received from the remote server 154.

At operation 222, the control device 550 establishes the third network communication path 143*c* with the remote server 154. At operation 224, the control device 550 detects a network information 144 based on the third network communication path 143*c*. The network information 144 may include network signal measurements and characteristics, similar to that described in FIG. 1. The network information 144 may provide information about network communication conditions along the road 102.

At operation 226, the control device 550 communicates the first cellular information 142*a*, the second cellular information 142*b*, and the network information 144 to the oversight server 160. The oversight server 160 may analyze the received data and create a cellular map 104, similar to that described in FIG. 1. The operations for generating the cellular map 104 are also described in conjunction with FIG. 3.

In certain embodiments, the control device 550 and/or the oversight server 160 may compare the first cellular information 142*a* with the network communication requirements 176. The control device 550 and/or the oversight server 160 may compare the second cellular information 142*b* with the network communication requirements 176. In response, the control device 550 and/or the oversight server 160 may dynamically switch (or select) between the network providers 150*a* and 150*b* based on the comparison between the first cellular information 142*a* and the network communication requirements 176 and the comparison between the second cellular information 142*b* and the network communication requirements 176, such that the selected network provider 150 is determined to satisfy the network communication requirements 176, similar to that described in FIG. 1. For example, in response to creating the cellular map 104, the control device 550 and/or the oversight server 160 may determine that the cellular map 104 indicates that the first provider 150*a* does not provide cellular coverage that satisfies network communication requirements 176 within a particular geographical area. The control device 550 and/or the oversight server 160 may determine that the cellular map 104 indicates that the second network provider 150*b* provides cellular coverage that satisfies the network communication requirements 176 within the particular geographical area. In response, the control device 550 and/or the oversight server 160 may select the second network provider 150*b* over the first network provider 150*a* for data communications.

Example Method for Generating a Cellular Map

Figure 3:
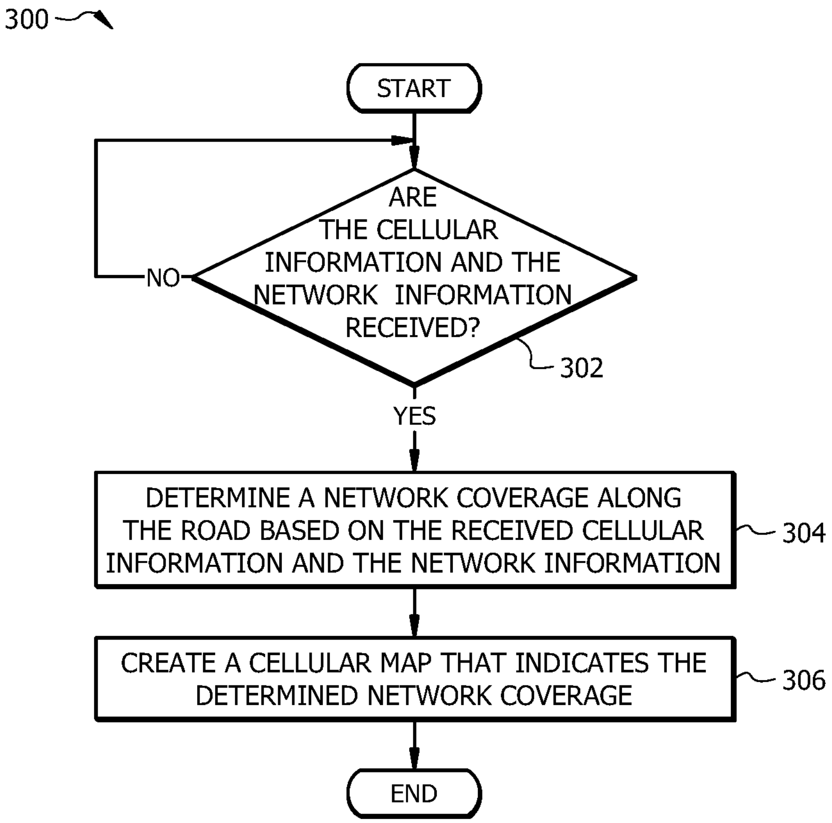
FIG. 3 illustrates an example flowchart of a method for creating a cellular map.

FIG. 3 illustrates an example flowchart of a method 300 for generating a cellular map 104. Modifications, additions, or omissions may be made to method 300. Method 300 may include more, fewer, or other operations. For example, operations may be performed in parallel or in any suitable order. While at times discussed as the system 100, autonomous vehicle 502, control device 550, oversight server 160, or components of any of thereof performing operations, any suitable system or components of the system may perform one or more operations of the method 300. For example, one or more operations of method 300 may be implemented, at least in part, in the form of software instructions 128, AVCG manager 140, software instructions 170, processing instructions 580, respectively, from FIGS. 1 and 5, stored on non-transitory, tangible, machine-readable media (e.g., one or more memory 126, 168, and data storage 590, respectively, from FIGS. 1 and 5) that when run by one or more processors (e.g., processors 122, 162, 570, respectively, from FIGS. 1 and 5) may cause the one or more processors to perform operations 302-306.

In certain embodiments, the method 300 may be a continuation of the method 200 described in FIG. 2. At operation 302, the oversight server 160 may determine whether the cellular information 142 and network information 144 are received. For example, the oversight server 160 may receive the cellular information 142 and network information 144 from the control device 550, similar to that described in FIG. 1. Example content of the cellular information 142 and the network information 144 is described in FIG. 1. The oversight server 160 may also receive location data 146. Each of the cellular information 142, network information 144, and the location data 146 may be associated with respective timestamp windows 148, similar to that described in FIG. 1.

At operation 304, the oversight server 160 may determine a network coverage along the road 102 based on the received data. In this operation, the oversight server 160 may determine the network coverage based on the link between each of the location data 146, network information 144, and cellular information 142 and respective timestamps 148, similar to that described in FIG. 1. In certain embodiments, the network coverage map 104 indicates the network coverage along the road 102 with respect to the location data 146 and during the timestamp window 148, similar to that described in FIGS. 4A-B.

At operation 306, the oversight server 160 may create a cellular map 104 that indicates the determined network coverage. The cellular map 104 may be a virtual map (e.g., shown in an image) that shows the network coverage at various geographical locations along the road 102.

FIGS. 4A-B illustrate example cellular maps 104*a-b* that show network coverage provided by the network providers 150*a-b*, respectively. Aspects of the example cellular maps 104*a-b* are described in the discussion of FIG. 1.

Example Autonomous Vehicle and its Operation

FIG. 5 shows a block diagram of an example vehicle ecosystem 500 in which autonomous driving operations can be determined. As shown in FIG. 5, the autonomous vehicle 502 may be a semi-trailer truck. The vehicle ecosystem 500 may include several systems and components that can generate and/or deliver one or more sources of information/data and related services to the in-vehicle control computer 550 that may be located in an autonomous vehicle 502. The in-vehicle control computer 550 can be in data communication with a plurality of vehicle subsystems 540, all of which can be resident in the autonomous vehicle 502. A vehicle subsystem interface 560 may be provided to facilitate data communication between the in-vehicle control computer 550 and the plurality of vehicle subsystems 540. In some embodiments, the vehicle subsystem interface 560 can include a controller area network (CAN) controller to communicate with devices in the vehicle subsystems 540.

The autonomous vehicle 502 may include various vehicle subsystems that support the operation of the autonomous vehicle 502. The vehicle subsystems 540 may include a vehicle drive subsystem 542, a vehicle sensor subsystem 544, a vehicle control subsystem 548, and/or network communication subsystem 592. The components or devices of the vehicle drive subsystem 542, the vehicle sensor subsystem 544, and the vehicle control subsystem 548 shown in FIG. 5 are examples. The autonomous vehicle 502 may be configured as shown or any other configurations.

The vehicle drive subsystem 542 may include components operable to provide powered motion for the autonomous vehicle 502. In an example embodiment, the vehicle drive subsystem 542 may include an engine/motor 542*a*, wheels/tires 542*b*, a transmission 542*c*, an electrical subsystem 542*d*, and a power source 542*c*.

The vehicle sensor subsystem 544 may include a number of sensors 546 configured to sense information about an environment or condition of the autonomous vehicle 502. The vehicle sensor subsystem 544 may include one or more cameras 546*a* or image capture devices, a radar unit 546*b*, one or more thermal sensors 546*c*, a wireless communication unit 546*d* (e.g., a cellular communication transceiver), an inertial measurement unit (IMU) 546*e*, a laser range finder/LiDAR unit 546*f*, a Global Positioning System (GPS) transceiver 546*g*, a wiper control system 546*h*. The vehicle sensor subsystem 544 may also include sensors configured to monitor internal systems of the autonomous vehicle 502 (e.g., an 02 monitor, a fuel gauge, an engine oil temperature, etc.).

The IMU 546*e* may include any combination of sensors (e.g., accelerometers and gyroscopes) configured to sense position and orientation changes of the autonomous vehicle 502 based on inertial acceleration. The GPS transceiver 546*g* may be any sensor configured to estimate a geographic location of the autonomous vehicle 502. For this purpose, the GPS transceiver 546*g* may include a receiver/transmitter operable to provide information regarding the position of the autonomous vehicle 502 with respect to the Earth. The radar unit 546*b* may represent a system that utilizes radio signals to sense objects within the local environment of the autonomous vehicle 502. In some embodiments, in addition to sensing the objects, the radar unit 546*b* may additionally be configured to sense the speed and the heading of the objects proximate to the autonomous vehicle 502. The laser range finder or LiDAR unit 546*f* may be any sensor configured to use lasers to sense objects in the environment in which the autonomous vehicle 502 is located. The cameras 546*a* may include one or more devices configured to capture a plurality of images of the environment of the autonomous vehicle 502. The cameras 546*a* may be still image cameras or motion video cameras.

Cameras 546*a* may be rear-facing and front-facing so that pedestrians, and any hand signals made by them or signs held by pedestrians, may be observed from all around the autonomous vehicle. These cameras 546*a* may include video cameras, cameras with filters for specific wavelengths, as well as any other cameras suitable to detect hand signals, hand-held traffic signs, or both hand signals and hand-held traffic signs. A sound detection array, such as a microphone or array of microphones, may be included in the vehicle sensor subsystem 544. The microphones of the sound detection array may be configured to receive audio indications of the presence of, or instructions from, authorities, including sirens and commands such as "Pull over." These microphones are mounted, or located, on the external portion of the vehicle, specifically on the outside of the tractor portion of an autonomous vehicle. Microphones used may be any suitable type, mounted such that they are effective both when the autonomous vehicle is at rest, as well as when it is moving at normal driving speeds.

The vehicle control subsystem 548 may be configured to control the operation of the autonomous vehicle 502 and its components. Accordingly, the vehicle control subsystem 548 may include various elements such as a throttle and gear selector 548*a*, a brake unit 548*b*, a navigation unit 548*c*, a steering system 548*d*, and/or an autonomous control unit 548*c*. The throttle and gear selector 548*a* may be configured to control, for instance, the operating speed of the engine and, in turn, control the speed of the autonomous vehicle 502. The throttle and gear selector 548*a* may be configured to control the gear selection of the transmission. The brake unit 548*b* can include any combination of mechanisms configured to decelerate the autonomous vehicle 502. The brake unit 548*b* can slow the autonomous vehicle 502 in a standard manner, including by using friction to slow the wheels or engine braking. The brake unit 548*b* may include an anti-lock brake system (ABS) that can prevent the brakes from locking up when the brakes are applied. The navigation unit 548*c* may be any system configured to determine a driving path or route for the autonomous vehicle 502. The navigation unit 548*c* may additionally be configured to update the driving path dynamically while the autonomous vehicle 502 is in operation. In some embodiments, the navigation unit 548*c* may be configured to incorporate data from the GPS transceiver 546*g* and one or more predetermined maps so as to determine the driving path for the autonomous vehicle 502. The steering system 548*d* may represent any combination of mechanisms that may be operable to adjust the heading of autonomous vehicle 502 in an autonomous mode or in a driver-controlled mode.

The autonomous control unit 548*e* may represent a control system configured to identify, evaluate, and avoid or otherwise negotiate potential obstacles or obstructions in the environment of the autonomous vehicle 502. In general, the autonomous control unit 548*e* may be configured to control the autonomous vehicle 502 for operation without a driver or to provide driver assistance in controlling the autonomous vehicle 502. In some embodiments, the autonomous control unit 548*e* may be configured to incorporate data from the GPS transceiver 546*g*, the radar unit 546*b*, the LiDAR unit 546*f*, the cameras 546*a*, and/or other vehicle subsystems to determine the driving path or trajectory for the autonomous vehicle 502.

The network communication subsystem 592 may comprise network interfaces, such as routers, switches, modems, and/or the like. The network communication subsystem 592 may be configured to establish communication between the autonomous vehicle 502 and other systems, servers, etc. The network communication subsystem 592 may be further configured to send and receive data from and to other systems.

Many or all of the functions of the autonomous vehicle 502 can be controlled by the in-vehicle control computer 550. The in-vehicle control computer 550 may include at least one data processor 570 (which can include at least one microprocessor) that executes processing instructions 580 stored in a non-transitory computer-readable medium, such as the data storage device 590 or memory. The in-vehicle control computer 550 may also represent a plurality of computing devices that may serve to control individual components or subsystems of the autonomous vehicle 502 in a distributed fashion. In some embodiments, the data storage device 590 may contain processing instructions 580 (e.g., program logic) executable by the data processor 570 to perform various methods and/or functions of the autonomous vehicle 502, including those described with respect to FIGS. 1-7.

The data storage device 590 may contain additional instructions as well, including instructions to transmit data to, receive data from, interact with, or control one or more of the vehicle drive subsystem 542, the vehicle sensor subsystem 544, and the vehicle control subsystem 548. The in-vehicle control computer 550 can be configured to include a data processor 570 and a data storage device 590. The in-vehicle control computer 550 may control the function of the autonomous vehicle 502 based on inputs received from various vehicle subsystems (e.g., the vehicle drive subsystem 542, the vehicle sensor subsystem 544, and the vehicle control subsystem 548).

FIG. 6 shows an exemplary system 600 for providing precise autonomous driving operations. The system 600 may include several modules that can operate in the in-vehicle control computer 650, as described in FIG. 5. The in-vehicle control computer 650 may include a sensor fusion module 602 shown in the top left corner of FIG. 6, where the sensor fusion module 602 may perform at least four image or signal processing operations. The sensor fusion module 602 can obtain images from cameras located on an autonomous vehicle to perform image segmentation 604 to detect the presence of moving objects (e.g., other vehicles, pedestrians, etc.,) and/or static obstacles (e.g., stop sign, speed bump, terrain, etc.,) located around the autonomous vehicle. The sensor fusion module 602 can obtain LiDAR point cloud data item from LiDAR sensors located on the autonomous vehicle to perform LiDAR segmentation 606 to detect the presence of objects and/or obstacles located around the autonomous vehicle.

The sensor fusion module 602 can perform instance segmentation 608 on image and/or point cloud data items to identify an outline (e.g., boxes) around the objects and/or obstacles located around the autonomous vehicle. The sensor fusion module 602 can perform temporal fusion 610 where objects and/or obstacles from one image and/or one frame of point cloud data item are correlated with or associated with objects and/or obstacles from one or more images or frames subsequently received in time.

The sensor fusion module 602 can fuse the objects and/or obstacles from the images obtained from the camera and/or point cloud data item obtained from the LiDAR sensors. For example, the sensor fusion module 602 may determine based on a location of two cameras that an image from one of the cameras comprising one half of a vehicle located in front of the autonomous vehicle is the same as the vehicle captured by another camera. The sensor fusion module 602 may send the fused object information to the tracking or prediction module 646 and the fused obstacle information to the occupancy grid module 660. The in-vehicle control computer may include the occupancy grid module 660 which can retrieve landmarks from a map database 658 stored in the in-vehicle control computer. The occupancy grid module 660 can determine drivable areas and/or obstacles from the fused obstacles obtained from the sensor fusion module 602 and the landmarks stored in the map database 658. For example, the occupancy grid module 660 can determine that a drivable area may include a speed bump obstacle.

As shown in FIG. 6 below the sensor fusion module 602, the in-vehicle control computer (650 in FIG. 5) may include a LiDAR-based object detection module 612 that can perform object detection 616 based on point cloud data item obtained from the LiDAR sensors 614 located on the autonomous vehicle. The object detection 616 technique can provide a location (e.g., in 3D world coordinates) of objects from the point cloud data item. Below the LiDAR-based object detection module 612, the in-vehicle control computer may include an image-based object detection module 618 that can perform object detection 624 based on images obtained from cameras 620 located on the autonomous vehicle. For example, the object detection 618 technique can employ a deep image-based object detection 624 (e.g., a machine learning technique) to provide a location (e.g., in 3D world coordinates) of objects from the image provided by the camera 620.

The radar 656 on the autonomous vehicle can scan an area surrounding the autonomous vehicle or an area towards which the autonomous vehicle is driven. The Radar data may be sent to the sensor fusion module 602 that can use the Radar data to correlate the objects and/or obstacles detected by the radar 656 with the objects and/or obstacles detected from both the LiDAR point cloud data item and the camera image. The Radar data also may be sent to the tracking or prediction module 646 that can perform data processing on the Radar data to track objects by object tracking module 648 as further described below.

The in-vehicle control computer may include a tracking or prediction module 646 that receives the locations of the objects from the point cloud and the objects from the image, and the fused objects from the sensor fusion module 602. The tracking or prediction module 646 also receives the Radar data with which the tracking or prediction module 646 can track objects by object tracking module 648 from one point cloud data item and one image obtained at one time instance to another (or the next) point cloud data item and another image obtained at another subsequent time instance.

The tracking or prediction module 646 may perform object attribute estimation 650 to estimate one or more attributes of an object detected in an image or point cloud data item. The one or more attributes of the object may include a type of object (e.g., pedestrian, car, or truck, etc.). The tracking or prediction module 646 may perform behavior prediction 652 to estimate or predict the motion pattern of an object detected in an image and/or a point cloud. The behavior prediction 652 can be performed to detect a location of an object in a set of images received at different points in time (e.g., sequential images) or in a set of point cloud data items received at different points in time (e.g., sequential point cloud data items). In some embodiments, the behavior prediction 652 can be performed for each image received from a camera and/or each point cloud data item received from the LiDAR sensor. In some embodiments, the tracking or prediction module 646 can be performed (e.g., run or executed) on received data to reduce computational load by performing behavior prediction 652 on every other or after every pre-determined number of images received from a camera or point cloud data item received from the LiDAR sensor (e.g., after every two images or after every three-point cloud data items).

The behavior prediction 652 feature may determine the speed and direction of the objects that surround the autonomous vehicle from the Radar data, where the speed and direction information can be used to predict or determine motion patterns of objects. A motion pattern may comprise a predicted trajectory information of an object over a predetermined length of time in the future after an image is received from a camera. Based on the motion pattern predicted, the tracking or prediction module 646 may assign motion pattern situational tags to the objects (e.g., "located at coordinates (x,y)," "stopped," "driving at 50 mph," "speeding up" or "slowing down"). The situation tags can describe the motion pattern of the object. The tracking or prediction module 646 may send the one or more object attributes (e.g., types of the objects) and motion pattern situational tags to the planning module 662. The tracking or prediction module 646 may perform an environment analysis 654 using any information acquired by system 500 and any number and combination of its components.

The in-vehicle control computer may include the planning module 662 that receives the object attributes and motion pattern situational tags from the tracking or prediction module 646, the drivable area and/or obstacles, and the vehicle location and pose information from the fused localization module 626 (further described below).

The planning module 662 can perform navigation planning 664 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 664 may include determining an area next to the road where the autonomous vehicle can be safely parked in a case of emergencies. The planning module 662 may include behavioral decision making 666 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 662 performs trajectory generation 668 and selects a trajectory from the set of trajectories determined by the navigation planning operation 664. The selected trajectory information may be sent by the planning module 662 to the control module 670.

The in-vehicle control computer may include a control module 670 that receives the proposed trajectory from the planning module 662 and the autonomous vehicle location and pose from the fused localization module 626. The control module 670 may include a system identifier 672. The control module 670 can perform a model-based trajectory refinement 674 to refine the proposed trajectory. For example, the control module 670 can apply filtering (e.g., Kalman filter) to make the proposed trajectory data smooth and/or to minimize noise. The control module 670 may perform the robust control 676 by determining, based on the refined proposed trajectory information and current location and/or pose of the autonomous vehicle, an amount of brake pressure to apply, a steering angle, a throttle amount to control the speed of the vehicle, and/or a transmission gear. The control module 670 can send the determined brake pressure, steering angle, throttle amount, and/or transmission gear to one or more devices in the autonomous vehicle to control and facilitate precise driving operations of the autonomous vehicle.

The deep image-based object detection 624 performed by the image-based object detection module 618 can also be used detect landmarks (e.g., stop signs, speed bumps, etc.,) on the road. The in-vehicle control computer may include a fused localization module 626 that obtains landmarks detected from images, the landmarks obtained from a map database 636 stored on the in-vehicle control computer, the landmarks detected from the point cloud data item by the LiDAR-based object detection module 612, the speed and displacement from the odometer sensor 644, or a rotary encoder, and the estimated location of the autonomous vehicle from the GPS/IMU sensor 638 (i.e., GPS sensor 640 and IMU sensor 642) located on or in the autonomous vehicle. Based on this information, the fused localization module 626 can perform a localization operation 628 to determine a location of the autonomous vehicle, which can be sent to the planning module 662 and the control module 670.

The fused localization module 626 can estimate pose 630 of the autonomous vehicle based on the GPS and/or IMU sensors 638. The pose of the autonomous vehicle can be sent to the planning module 662 and the control module 670. The fused localization module 626 can also estimate status (e.g., location, possible angle of movement) of the trailer unit based on (e.g., trailer status estimation 634), for example, the information provided by the IMU sensor 642 (e.g., angular rate and/or linear velocity). The fused localization module 626 may also check the map content 632.

Figure 7:
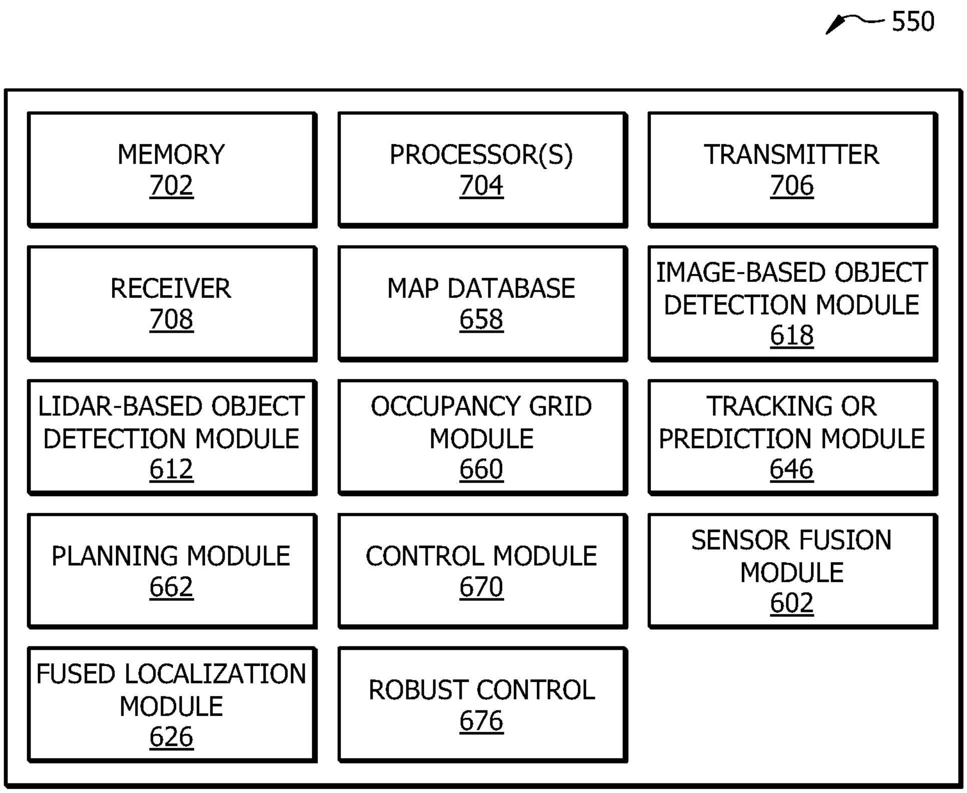
FIG. 7 illustrates a block diagram of an in-vehicle control computer included in the autonomous vehicle of FIG. 5.

FIG. 7 shows an exemplary block diagram of an in-vehicle control computer 550 included in an autonomous vehicle 502. The in-vehicle control computer 550 may include at least one processor 704 and a memory 702 having instructions stored thereupon (e.g., software instructions 128 and processing instructions 580 in FIGS. 1 and 5, respectively). The instructions, upon execution by the processor 704, configure the in-vehicle control computer 550 and/or the various modules of the in-vehicle control computer 550 to perform the operations described in FIGS. 1-7. The transmitter 706 may transmit or send information or data to one or more devices in the autonomous vehicle. For example, the transmitter 706 can send an instruction to one or more motors of the steering wheel to steer the autonomous vehicle. The receiver 708 receives information or data transmitted or sent by one or more devices. For example, the receiver 708 receives a status of the current speed from the odometer sensor or the current transmission gear from the transmission. The transmitter 706 and receiver 708 also may be configured to communicate with the plurality of vehicle subsystems 540 and the in-vehicle control computer 550 described above in FIGS. 5 and 6.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system comprising:

a memory configured to store a routing plan for a first autonomous vehicle, wherein the routing plan indicates a road to be traveled by the first autonomous vehicle; and a processor operably coupled to the memory, and configured to:

access a first plurality of cellular information that comprises information about cellular communication conditions along at least a portion of the road, wherein:

the first plurality of cellular information comprises:

a first cellular information associated with a first network provider, wherein the first cellular information comprises information about cellular communication conditions determined from a first communication path with a first base station, the first communication path provided by the first network provider, and a second cellular information associated with a second network provider, wherein the second cellular information comprises information about cellular communication conditions determined from a second communication path with a second base station, the second communication path provided by the second network provider;

access a first network information that comprises information about network communication conditions along at least the portion of the road;

determine a first network coverage along at least the portion of the road based at least in part upon the first plurality of cellular information and the first network information; and create a first network coverage map that indicates the determined network coverage along at least the portion of the road.

Clause 2. The system of Clause 1, wherein the first network coverage map is represented by an image showing the determined network coverage along at least the portion of the road.

Clause 3. The system of Clause 1, wherein the first cellular information comprises at least one of:
- a first cellular bandwidth;
- a first cellular signal strength;
- a first cellular signal to noise ratio;
- a first cellular data package loss rate;
- a first cellular latency;
- a first cellular round-trip time; or
- a first cellular signal bit rate.

Clause 4. The system of Clause 1, wherein the second cellular information comprises at least one of:
- a second cellular bandwidth;
- a second cellular signal strength;
- a second cellular signal to noise ratio;
- a second cellular data package loss rate;
- a second cellular latency;
- a second cellular round-trip time; or
- a second cellular signal bit rate.

Clause 5. The system of Clause 1, wherein the first network information comprises at least one of:
- a network communication bandwidth;
- a network communication signal strength;
- a network communication signal to noise ratio;
- a network communication data package loss rate;
- a network communication latency;
- a network communication round-trip time; or
- a network communication signal bit rate.

Clause 6. The system of Clause 1, wherein the processor is further configured to: access network communication requirements for data communications of the first autonomous vehicle;
- compare the network communication requirements with a first cellular communication condition indicated by the first cellular information;
- determine that the first cellular communication condition does not satisfy the network communication requirements; and
- in response to determining that the first cellular communication condition does not satisfy the network communication requirements, determine that the first network provider does not satisfy the network communication requirements.

Clause 7. The system of Clause 6, wherein the network communication requirements comprise at least one of:
- a threshold network communication bandwidth;
- a threshold signal strength;
- a threshold signal to noise ratio;
- a threshold data package loss rate;
- a threshold latency;
- a threshold round-trip time; or
- a threshold signal bit rate.

Clause 8. The system of Clause 6, wherein the processor is further configured to:
- compare the network communication requirements with a second cellular communication condition indicated by the second cellular information;
- determine that the second cellular communication condition satisfies the network communication requirements;
- in response to determining that the second cellular communication condition satisfies the network communication requirements:
  - determine that the second network provider satisfies the network communication requirements; and
  - route data communications for the first autonomous vehicle via the second network provider.

Clause 9. A method comprising:
- accessing a first plurality of cellular information that comprises information about cellular communication conditions along at least a portion of a road traveled by a first autonomous vehicle, wherein:
  - the first plurality of cellular information comprises:
    - a first cellular information associated with a first network provider, wherein the first cellular information comprises information about cellular communication conditions determined from a first communication path with a first base station, the first communication path provided by the first network provider, and
    - a second cellular information associated with a second network provider, wherein the second cellular information comprises information about cellular communication conditions determined from a second communication path with a second base station, the second communication path provided by the second network provider;
  - accessing a first network information that comprises information about network communication conditions along at least the portion of the road;
  - determining a first network coverage along at least the portion of the road based at least in part upon the first plurality of cellular information and the first network information; and
  - creating a first network coverage map that indicates the determined network coverage along at least the portion of the road.

Clause 10. The method of Clause 9, further comprising:
- determining that the first network coverage map indicates a particular network coverage at a particular portion of the road;
- determining that the particular network coverage does not satisfy network communication requirements for data communications of the first autonomous vehicle;
- in response to determining that the particular network coverage does not satisfy the network communication requirements for data communications:
  - issuing a command indicating to avoid the particular portion of the road; and
  - communicating the command to one or more autonomous vehicles that are traveling toward the particular portion of the road, such that the one or more autonomous vehicles are navigated according to the command.

Clause 11. The method of Clause 10, wherein the command comprises at least one of:
- an instruction to take a detour;
- an instruction to pull over; or
- an instruction to stop.

Clause 12. The method of Clause 9, wherein the first network information is associated with communications according to one or more radio access technologies (RATs) comprising Fifth-Generation New Radio (5G NR) and Long Term Evolution (LTE).

Clause 13. The method of Clause 9, wherein the first plurality of cellular information and the first network information are associated with a first trip of the first autonomous vehicle.

Clause 14. The method of Clause 13, further comprising:
- accessing a second plurality of cellular information that comprises information about cellular communication conditions along at least the portion of the road, wherein:

the second plurality of cellular information is associated with a second trip of a second autonomous vehicle;

the second plurality of cellular information comprises:

a third cellular information associated with the first network provider, wherein the third cellular information comprises information about cellular communication conditions determined from communications with the first network provider, and a fourth cellular information associated with the second network provider, wherein the fourth cellular information comprises information about cellular communication conditions determined from communications with the second network provider;

access a second network information that comprises information about network communication conditions along at least the portion of the road, wherein:

the second network information is associated with the second trip of the second autonomous vehicle;

the second network information is separate from the second plurality of cellular information; and the second network information is detected from communications with a remote server; and determining a second network coverage along at least the portion of the road based at least in part upon the second plurality of cellular information and the second network information.

Clause 15. The method of Clause 14, further comprising:

comparing the first network coverage with the second network coverage;

determining that the first network coverage does not correspond to the second network coverage; and in response to determining that the first network coverage does not correspond to the second network coverage, determining which of the first autonomous vehicle and the second autonomous vehicle is associated with an anomalous network communication device.

Clause 16. The method of Clause 15, wherein determining which of the first autonomous vehicle and the second autonomous vehicle is associated with an anomalous network communication device comprises:

executing a diagnostic instruction on a first network communication device associated with the first autonomous vehicle, wherein the diagnostic instruction comprises code to determine whether a network communication device is operational;

determining a first result of the diagnostic instruction executed on the first network communication device;

based at least in part upon the first result of the diagnostic instruction executed on the first network communication device, determining that the first network communication device is anomalous;

executing the diagnostic instruction on a second network communication device associated with the second autonomous vehicle;

determining a second result of the diagnostic instruction executed on the second network communication device;

based at least in part upon the second result of the diagnostic instruction on the second network communication device, determining that the second network communication device is not anomalous; and determining that the first autonomous vehicle needs a service to address the anomalous first network communication device.

Clause 17. A non-transitory computer-readable medium storing instructions that when executed by a processor cause the processor to:

access a first plurality of cellular information that comprises information about cellular communication conditions along at least a portion of a road traveled by a first autonomous vehicle, wherein:

the first plurality of cellular information comprises:

a first cellular information associated with a first network provider, wherein the first cellular information comprises information about cellular communication conditions determined from a first communication path with a first base station, the first communication path provided by the first network provider, and a second cellular information associated with a second network provider, wherein the second cellular information comprises information about cellular communication conditions determined from a second communication path with a second base station, the second communication path provided by the second network provider;

access a first network information that comprises information about network communication conditions along at least the portion of the road;

determine a first network coverage along at least the portion of the road based at least in part upon the first plurality of cellular information and the first network information; and create a first network coverage map that indicates the determined network coverage along at least the portion of the road.

Clause 18. The non-transitory computer-readable medium of Clause 17, wherein the first autonomous vehicle comprises at least one of a camera, a light detection and ranging (LiDAR) sensor, a motion sensor, a Radar sensor, or an infrared sensor.

Clause 19. The non-transitory computer-readable medium of Clause 17, wherein:

the first network information is separate from the first plurality of cellular information; and the first network information is detected from a third communication path with a remote server.

Clause 20. The non-transitory computer-readable medium of Clause 17, wherein the first network coverage map is represented by an image showing the determined network coverage along at least the portion of the road.

Clause 21. A system comprising:

a first network interface subscribed to a first network provider and configured to communicate with a first base station via network paths provided by the first network provider;

a second network interface subscribed to a second network provider and configured to communicate with a second base station via network paths provided by the second network provider; and a processor operably coupled to the first network interface and the second network interface, the processor being associated with a vehicle, and configured to:

establish a first network communication path with the first base station using the first network interface;

detect a first cellular information associated with the first network provider based at least in part upon the first established network communication path with the first base station, wherein the first cellular information provides information about cellular communication conditions provided by the first network provider along at least a portion of a road;

establish a second network communication path with the second base station using the second network interface;

detect a second cellular information associated with the second network provider based at least in part upon the second established network communication path with the second base station, wherein the second cellular information provides information about cellular communication conditions provided by the second network provider along at least the portion of the road;

establish a third network communication path with a remote server using either of the first network interface or the second network interface; and detect network information based at least in part upon the third established network communication path with the remote server, wherein a network coverage along at least the portion of the road is determined based at least in part upon the first cellular information, the second cellular information, and the network information.

Clause 22. The system of Clause 21, wherein the processor is further configured to communicate the first cellular information, the second cellular information, and the network information to an oversight server.

Clause 23. The system of Clause 22, wherein a network coverage map is created by the oversight server based at least in part upon the network coverage along at least the portion of the road in response to communicating the first cellular information, the second cellular information, and the network information to the oversight server.

Clause 24. The system of Clause 23, wherein:

the processor is further configured to:

determine a timestamp window that indicates a period during which the first cellular information, the second cellular information, and the network information are detected;

determine location data that indicates location coordinates of the vehicle;

communicate data indicating the timestamp window to the oversight server; and communicate the location data to the oversight server; and the network coverage map indicates the network coverage with respect to the location data and during the timestamp window.

Clause 25. The system of Clause 23, wherein the network coverage map is represented by an image showing the determined network coverage along at least the portion of the road.

Clause 26. The system of Clause 21, wherein:

establishing the first network communication path with the first base station comprises:

transmitting a first data package to the first base station; and receiving a first acknowledgment message that indicates the first data package is received by the first base station;

establishing the second network communication path with the second base station comprises:

transmitting a second data package to the second base station; and receiving a second acknowledgment message that indicates the second data package is received by the second base station;

establishing the third network communication path with the remote server comprises:

transmitting a third data package to the remote server; and receiving a third acknowledgment message that indicates the third data package is received by the remote server.

Clause 27. The system of Clause 21, wherein:

the first cellular information is associated with a one-hop network communication between the processor and the first base station; and the second cellular information is associated with a one-hop network communication between the processor and the second base station.

Clause 28. A method comprising:

establishing a first network communication path with a first base station using a first network interface, wherein the first network interface is subscribed to a first network provider;

detecting a first cellular information associated with the first network provider based at least in part upon the first established network communication path with the first base station, wherein the first cellular information provides information about cellular communication conditions provided by the first network provider along at least a portion of a road traveled by a vehicle;

establishing a second network communication path with a second base station using a second network interface, wherein the second network interface is subscribed to a second network provider;

detecting a second cellular information associated with the second network provider based at least in part upon the second established network communication path with the second base station, wherein the second cellular information provides information about cellular communication conditions provided by the second network provider along at least the portion of the road;

establishing a third network communication path with a remote server using either of the first network interface or the second network interface; and detecting network information based at least in part upon the third established network communication path with the remote server, wherein a network coverage along at least the portion of the road is determined based at least in part upon the first cellular information, the second cellular information, and the network information.

Clause 29. The method of Clause 28, wherein the network information is associated with a multiple-hop network communication between the remote server and a control device that is onboard the vehicle.

Clause 30. The method of Clause 28, wherein the first cellular information comprises at least one of:

a first cellular signal bandwidth;

a first cellular signal strength;

a first cellular signal-to-noise ratio;

a first cellular data package loss rate;

a first cellular signal latency;

a first cellular signal round-trip time; or a first cellular signal bit rate.

Clause 31. The method of Clause 28, wherein the second cellular information comprises at least one of:

a second cellular signal bandwidth;

a second cellular signal strength;

a second cellular signal-to-noise ratio;

a second cellular data package loss rate;

a second cellular signal latency;

a second cellular signal round-trip time; or a second cellular signal bit rate.

Clause 32. The method of Clause 28, wherein the network information comprises at least one of:

a network communication bandwidth;

a network communication signal strength;

a network communication signal-to-noise ratio;

a network communication data package loss rate;

a network communication latency;

a network communication round-trip time; or a network communication signal bit rate.

Clause 33. The method of Clause 28, further comprising:

comparing the first cellular information with network communication requirements;

comparing the second cellular information with the network communication requirements; and dynamically selecting between the first network provider and the second network provider for data communications based at least in part upon the comparison between the first cellular information and the network communication requirements and the comparison between the second cellular information and the network communication requirements, such that the selected network provider is determined to satisfy the network communication requirements.

Clause 34. The method of Clause 33, wherein the network communication requirements comprise at least one of:

a threshold network communication bandwidth;

a threshold signal strength;

a threshold signal-to-noise ratio;

a threshold data package loss rate;

a threshold latency;

a threshold round-trip time; or a threshold signal bit rate.

Clause 35. A non-transitory computer-readable medium storing instructions that when executed by a processor, cause the processor to:

establish a first network communication path with a first base station using a first network interface, wherein the first network interface is subscribed to a first network provider;

detect a first cellular information associated with the first network provider based at least in part upon the first established network communication path with the first base station, wherein the first cellular information provides information about cellular communication conditions provided by the first network provider along at least a portion of a road traveled by a vehicle;

establish a second network communication path with a second base station using a second network interface, wherein the second network interface is subscribed to a second network provider;

detect a second cellular information associated with the second network provider based at least in part upon the second established network communication path with the second base station, wherein the second cellular information provides information about cellular communication conditions provided by the second network provider along at least the portion of the road;

establish a third network communication path with a remote server using either of the first network interface or the second network interface; and detect network information based at least in part upon the third established network communication path with the remote server, wherein a network coverage along at least the portion of the road is determined based at least in part upon the first cellular information, the second cellular information, and the network information.

Clause 36. The non-transitory computer-readable medium of Clause 35, wherein the instructions when executed by the processor, further cause the processor to:

access a network coverage map that indicates the network coverage along at least the portion of the road;

determine that the network coverage map indicates that the first network provider does not provide cellular coverage that satisfies network communication requirements within a particular geographical area;

determine that the network coverage map indicates that the second network provider provides cellular coverage that satisfies the network communication requirements within the particular geographical area; and select the second network provider for data communications.

Clause 37. The non-transitory computer-readable medium of Clause 35, wherein:

the first network interface is subscribed to the first network provider via a first Subscriber Identity Module (SIM) card associated with the first network provider; and the first SIM card is deployed in the first network interface.

Clause 38. The non-transitory computer-readable medium of Clause 35, wherein:

the second network interface is subscribed to the second network provider via a second Subscriber Identity Module (SIM) card associated with the second network provider; and the second SIM card is deployed in the second network interface.

Clause 39. The non-transitory computer-readable medium of Clause 35, wherein:

the network information provides information about network communication conditions along at least the portion of the road; and the network information is separate from each of the first cellular information and the second cellular information.

Clause 40. The non-transitory computer-readable medium of Clause 35, wherein the vehicle is a non-autonomous vehicle.

Clause 41. The system of any of Clauses 1-8, wherein the processor is further configured to perform one or more operations of a method according to any of Clauses 9-16.

Clause 42. The system of any of Clauses 1-8, wherein the processor is further configured to perform one or more operations according to any of Clauses 17-20.

Clause 43. An apparatus comprising means for performing a method according to any of Clauses 9-16.

Clause 44. An apparatus comprising means for performing a method according to any of Clauses 17-20.

Clause 45. The non-transitory computer-readable medium of any of Clauses 17-20 storing instructions that when executed by the processor causes the processor to perform one or more operations of a method according to any of Clauses 9-16.

Clause 46. The system of any of Clauses 21-27, wherein the processor is further configured to perform one or more operations of a method according to any of Clauses 28-34.

Clause 47. The system of any of Clauses 21-27, wherein the processor is further configured to perform one or more operations according to any of Clauses 35-40.

Clause 48. An apparatus comprising means for performing a method according to any of Clauses 28-34.

Clause 49. An apparatus comprising means for performing a method according to any of Clauses 35-40.

Clause 50. The non-transitory computer-readable medium of any of Clauses 35-40 storing instructions that when executed by the processor causes the processor to perform one or more operations of a method according to any of Clauses 28-34.

The invention claimed is:

1. A system comprising:

a memory configured to store a routing plan for a first autonomous vehicle, wherein the routing plan indicates a road to be traveled by the first autonomous vehicle; and a processor operably coupled to the memory, and configured to:

access a first plurality of cellular information that comprises information about cellular communication conditions along at least a portion of the road, wherein:

the first plurality of cellular information comprises:

a first cellular information associated with a first network provider, wherein the first cellular information comprises information about cellular communication conditions determined from a first communication path with a first base station, the first communication path provided by the first network provider, and a second cellular information associated with a second network provider, wherein the second cellular information comprises information about cellular communication conditions determined from a second communication path with a second base station, the second communication path provided by the second network provider;

access a first network information that comprises information about network communication conditions along at least the portion of the road;

determine a first network coverage along at least the portion of the road based at least in part upon the first plurality of cellular information and the first network information; and create a first network coverage map that indicates the determined network coverage along at least the portion of the road;

wherein the first plurality of cellular information and the first network information are associated with a first trip of the first autonomous vehicle;

wherein the processor is further configured to:

access a second plurality of cellular information that comprises information about cellular communication conditions along at least the portion of the road, wherein:

the second plurality of cellular information is associated with a second trip of a second autonomous vehicle;

the second plurality of cellular information comprises:

a third cellular information associated with the first network provider, wherein the third cellular information comprises information about cellular communication conditions determined from communications with the first network provider, and a fourth cellular information associated with the second network provider, wherein the fourth cellular information comprises information about cellular communication conditions determined from communications with the second network provider;

access a second network information that comprises information about network communication conditions along at least the portion of the road, wherein:

the second network information is associated with the second trip of the second autonomous vehicle;

the second network information is separate from the second plurality of cellular information; and the second network information is detected from communications with a remote server; and determine a second network coverage along at least the portion of the road based at least in part upon the second plurality of cellular information and the second network information, wherein the processor is further configured to:

compare the first network coverage with the second network coverage;

determine that the first network coverage does not correspond to the second network coverage; and in response to determining that the first network coverage does not correspond to the second network coverage, determine which of the first autonomous vehicle and the second autonomous vehicle is associated with an anomalous network communication device.

2. The system of claim 1, wherein the first network coverage map is represented by an image showing the determined network coverage along at least the portion of the road.

3. The system of claim 1, wherein the first cellular information comprises at least one of:

a first cellular bandwidth;
a first cellular signal strength;
a first cellular signal to noise ratio;
a first cellular data package loss rate;
a first cellular latency;
a first cellular round-trip time; or
a first cellular signal bit rate.

4. The system of claim 1, wherein the second cellular information comprises at least one of:

a second cellular bandwidth;
a second cellular signal strength;
a second cellular signal to noise ratio;
a second cellular data package loss rate;
a second cellular latency;
a second cellular round-trip time; or
a second cellular signal bit rate.

5. The system of claim 1, wherein the first network information comprises at least one of:

a network communication bandwidth;
a network communication signal strength;
a network communication signal to noise ratio;
a network communication data package loss rate;
a network communication latency;
a network communication round-trip time; or
a network communication signal bit rate.

6. The system of claim 1, wherein the processor is further configured to:

access network communication requirements for data communications of the first autonomous vehicle;

compare the network communication requirements with a first cellular communication condition indicated by the first cellular information;

determine that the first cellular communication condition does not satisfy the network communication requirements; and in response to determining that the first cellular communication condition does not satisfy the network communication requirements, determine that the first network provider does not satisfy the network communication requirements.

7. The system of claim 6, wherein the network communication requirements comprise at least one of:

a threshold network communication bandwidth;

a threshold signal strength;

a threshold signal to noise ratio;

a threshold data package loss rate;

a threshold latency;

a threshold round-trip time; or a threshold signal bit rate.

8. The system of claim 6, wherein the processor is further configured to:

compare the network communication requirements with a second cellular communication condition indicated by the second cellular information;

determine that the second cellular communication condition satisfies the network communication requirements;

in response to determining that the second cellular communication condition satisfies the network communication requirements;

determine that the second network provider satisfies the network communication requirements; and route data communications for the first autonomous vehicle via the second network provider.

9. A method comprising:

accessing a first plurality of cellular information that comprises information about cellular communication conditions along at least a portion of a road traveled by a first autonomous vehicle, wherein:

the first plurality of cellular information comprises:

a first cellular information associated with a first network provider, wherein the first cellular information comprises information about cellular communication conditions determined from a first communication path with a first base station, the first communication path provided by the first network provider, and a second cellular information associated with a second network provider, wherein the second cellular information comprises information about cellular communication conditions determined from a second communication path with a second base station, the second communication path provided by the second network provider;

accessing a first network information that comprises information about network communication conditions along at least the portion of the road;

determining a first network coverage along at least the portion of the road based at least in part upon the first plurality of cellular information and the first network information; and creating a first network coverage map that indicates the determined network coverage along at least the portion of the road;

wherein the first plurality of cellular information and the first network information are associated with a first trip of the first autonomous vehicle;

wherein the method further comprises:

accessing a second plurality of cellular information that comprises information about cellular communication conditions along at least the portion of the road, wherein:

the second plurality of cellular information is associated with a second trip of a second autonomous vehicle;

the second plurality of cellular information comprises:

a third cellular information associated with the first network provider, wherein the third cellular information comprises information about cellular communication conditions determined from communications with the first network provider, and a fourth cellular information associated with the second network provider, wherein the fourth cellular information comprises information about cellular communication conditions determined from communications with the second network provider;

accessing a second network information that comprises information about network communication conditions along at least the portion of the road, wherein:

the second network information is associated with the second trip of the second autonomous vehicle;

the second network information is separate from the second plurality of cellular information; and the second network information is detected from communications with a remote server; and determining a second network coverage along at least the portion of the road based at least in part upon the second plurality of cellular information and the second network information, wherein the method further comprises:

comparing the first network coverage with the second network coverage;

determining that the first network coverage does not correspond to the second network coverage; and in response to determining that the first network coverage does not correspond to the second network coverage, determining which of the first autonomous vehicle and the second autonomous vehicle is associated with an anomalous network communication device.

10. The method of claim 9, further comprising:

determining that the first network coverage map indicates a particular network coverage at a particular portion of the road;

determining that the particular network coverage does not satisfy network communication requirements for data communications of the first autonomous vehicle;

in response to determining that the particular network coverage does not satisfy the network communication requirements for data communications:

issuing a command indicating to avoid the particular portion of the road; and communicating the command to one or more autonomous vehicles that are traveling toward the particular portion of the road, such that the one or more autonomous vehicles are navigated according to the command.

11. The method of claim 10, wherein the command comprises at least one of:

an instruction to take a detour;

an instruction to pull over; or an instruction to stop.

12. The method of claim 9, wherein the first network information is associated with communications according to one or more radio access technologies (RATs) comprising Fifth-Generation New Radio (5G NR) and Long Term Evolution (LTE).

13. The method of claim 9, wherein determining which of the first autonomous vehicle and the second autonomous vehicle is associated with an anomalous network communication device comprises:

executing a diagnostic instruction on a first network communication device associated with the first autonomous vehicle, wherein the diagnostic instruction comprises code to determine whether a network communication device is operational;

determining a first result of the diagnostic instruction executed on the first network communication device;

based at least in part upon the first result of the diagnostic instruction executed on the first network communication device, determining that the first network communication device is anomalous;

executing the diagnostic instruction on a second network communication device associated with the second autonomous vehicle;

determining a second result of the diagnostic instruction executed on the second network communication device;

based at least in part upon the second result of the diagnostic instruction on the second network communication device, determining that the second network communication device is not anomalous; and determining that the first autonomous vehicle needs a service to address the anomalous first network communication device.

14. A non-transitory computer-readable medium storing instructions that when executed by a processor cause the processor to:

access a first plurality of cellular information that comprises information about cellular communication conditions along at least a portion of a road traveled by a first autonomous vehicle, wherein:

the first plurality of cellular information comprises:

a first cellular information associated with a first network provider, wherein the first cellular information comprises information about cellular communication conditions determined from a first communication path with a first base station, the first communication path provided by the first network provider, and a second cellular information associated with a second network provider, wherein the second cellular information comprises information about cellular communication conditions determined from a second communication path with a second base station, the second communication path provided by the second network provider;

access a first network information that comprises information about network communication conditions along at least the portion of the road;

determine a first network coverage along at least the portion of the road based at least in part upon the first plurality of cellular information and the first network information; and create a first network coverage map that indicates the determined network coverage along at least the portion of the road;

wherein the first plurality of cellular information and the first network information are associated with a first trip of the first autonomous vehicle;

wherein the instructions when executed by the processor further cause the processor to:

access a second plurality of cellular information that comprises information about cellular communication conditions along at least the portion of the road, wherein:

the second plurality of cellular information is associated with a second trip of a second autonomous vehicle;

the second plurality of cellular information comprises:

a third cellular information associated with the first network provider, wherein the third cellular information comprises information about cellular communication conditions determined from communications with the first network provider, and a fourth cellular information associated with the second network provider, wherein the fourth cellular information comprises information about cellular communication conditions determined from communications with the second network provider;

access a second network information that comprises information about network communication conditions along at least the portion of the road, wherein:

the second network information is associated with the second trip of the second autonomous vehicle;

the second network information is separate from the second plurality of cellular information; and the second network information is detected from communications with a remote server; and determine a second network coverage along at least the portion of the road based at least in part upon the second plurality of cellular information and the second network information, wherein the instructions when executed by the processor further cause the processor to:

compare the first network coverage with the second network coverage;

determine that the first network coverage does not correspond to the second network coverage; and in response to determining that the first network coverage does not correspond to the second network coverage, determine which of the first autonomous vehicle and the second autonomous vehicle is associated with an anomalous network communication device.

15. The non-transitory computer-readable medium of claim 14, wherein the first autonomous vehicle comprises at least one of a camera, a light detection and ranging (LiDAR) sensor, a motion sensor, a Radar sensor, or an infrared sensor.

16. The non-transitory computer-readable medium of claim 14, wherein:

the first network information is separate from the first plurality of cellular information; and the first network information is detected from a third communication path with a remote server.

17. The non-transitory computer-readable medium of claim 14, wherein the first network coverage map is represented by an image showing the determined network coverage along at least the portion of the road.

* * * * *